(12) United States Patent
Zhao et al.

(10) Patent No.: US 11,889,033 B2
(45) Date of Patent: Jan. 30, 2024

(54) FLARE MITIGATION VIA DECONVOLUTION USING HIGH DYNAMIC RANGE IMAGING

(71) Applicant: Samsung Electronics Company, Ltd., Suwon si (KR)

(72) Inventors: Ye Zhao, San Jose, CA (US);
Changgeng Liu, San Jose, CA (US);
Brian R. Patton, San Francisco, CA (US); Ernest Rehmatulla Post, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 25 days.

(21) Appl. No.: 17/742,197

(22) Filed: May 11, 2022

(65) Prior Publication Data
US 2023/0370735 A1      Nov. 16, 2023

(51) Int. Cl.
*H04N 25/587*        (2023.01)
*H04N 25/61*         (2023.01)

(52) U.S. Cl.
CPC ........... *H04N 25/587* (2023.01); *H04N 25/61* (2023.01)

(58) Field of Classification Search
CPC .............................. H04N 25/587; H04N 25/61
USPC ..................................................... 348/207.99
See application file for complete search history.

(56) References Cited

U.S. PATENT DOCUMENTS

| | | | |
|---|---|---|---|
| 7,780,364 B2 | 8/2010 | Raskar | |
| 8,848,063 B2 * | 9/2014 | Jo | H04N 5/265 348/229.1 |
| 10,126,406 B2 | 11/2018 | Altman | |
| 10,148,893 B2 | 12/2018 | Gupta | |
| 10,694,123 B2 | 5/2020 | Cossairt | |
| 10,795,018 B1 | 10/2020 | Koteshwara | |
| 10,986,284 B2 | 4/2021 | Lukac | |
| 11,076,103 B2 | 7/2021 | Gordon | |
| 11,132,771 B2 | 9/2021 | Gordon | |
| 2009/0273843 A1* | 11/2009 | Raskar | H04N 17/002 348/241 |
| 2017/0169768 A1 | 6/2017 | Atkins | |
| 2018/0211402 A1 | 7/2018 | Ciurea | |
| 2020/0014895 A1 | 1/2020 | Damberg | |
| 2020/0292990 A1 | 9/2020 | Christmas | |

(Continued)

OTHER PUBLICATIONS

U.S. Appl. No. 62/879,077, filed Jul. 26, 2019, Changgeng Liu.

(Continued)

*Primary Examiner* — Lin Ye
*Assistant Examiner* — Chan T Nguyen

(57) ABSTRACT

A method includes capturing, by a camera disposed behind a display panel of the electronic device, a plurality of images at a plurality of exposures, respectively. One or more captured images include one or more flare artifacts. The method further includes generating a high dynamic range (HDR) image by fusing the captured images. The method further includes accessing a HDR point spread function (PSF) from a memory of the electronic device. The HDR PSF may be generated, at an initial camera calibration stage, by fusing a plurality of PSFs captured at the plurality of exposures, respectively. The method further includes generating, using an image deconvolution technique, a reconstructed image with flare artifacts mitigated based on the HDR image and the HDR PSF.

20 Claims, 21 Drawing Sheets

(56) References Cited

U.S. PATENT DOCUMENTS

2021/0029336 A1\* 1/2021 Liu .................. H04N 23/80
2021/0243352 A1   8/2021 McElvain

OTHER PUBLICATIONS

U.S. Appl. No. 17/169,268, filed Feb. 5, 2021, Ye Zhao.
Removing Diffraction Image Artifacts in Under-Display Camera via Dynamic Skip Connection Network; Ruicheng Feng et al; Computer Vision Foundation; https://doi.org/10.48550/arXiv.2104.09556, Apr. 19, 2021.
"A Comparison of Techniques Used for the Removal of Lens Flare Found in High Dynamic Range Luminance Measurements"; Sarah Frances Safranek; Thesis submitted to the Faculty of the Graduate School of the University of Colorado in partial fulfillment of the requirement for the degree of Master of Science Department of Civil, Environmental, and Architectural Engineering, 2017.
Sarah Safranek et al. sources of error in HDRI for luminance measurement: a review of the literature, LEUKOS, vol. 17, No. 2, pp. 170-182, Mar. 3, 2020 pp. 175-176.
International Search Report and Written Opinion in Application No. PCT/KR2023/006224, dated Aug. 4, 2023.

\* cited by examiner

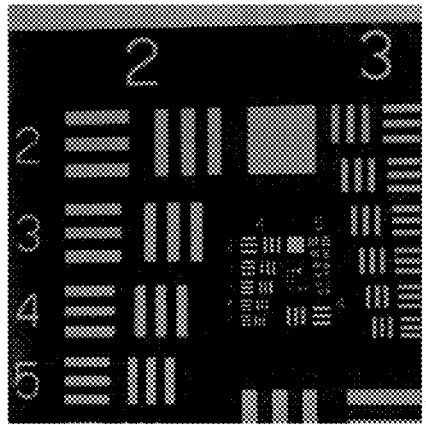
RECONSTRUCTED IMAGE BY PRIOR SOLUTION 502
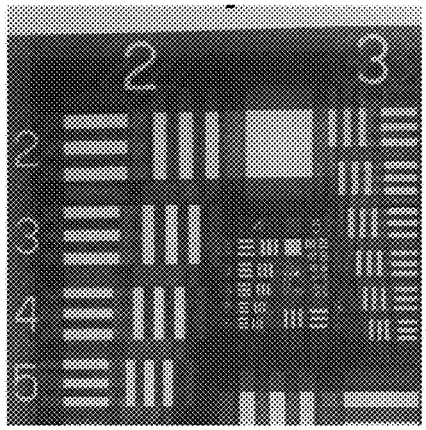
DEGRADED IMAGE 500
RECONSTRUCTED IMAGE BY PRIOR SOLUTION 512
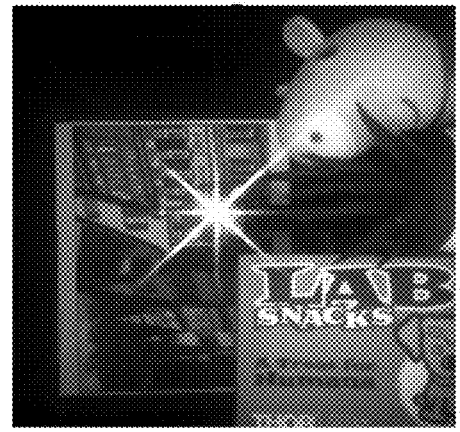
DEGRADED IMAGE 510
FIG. 5

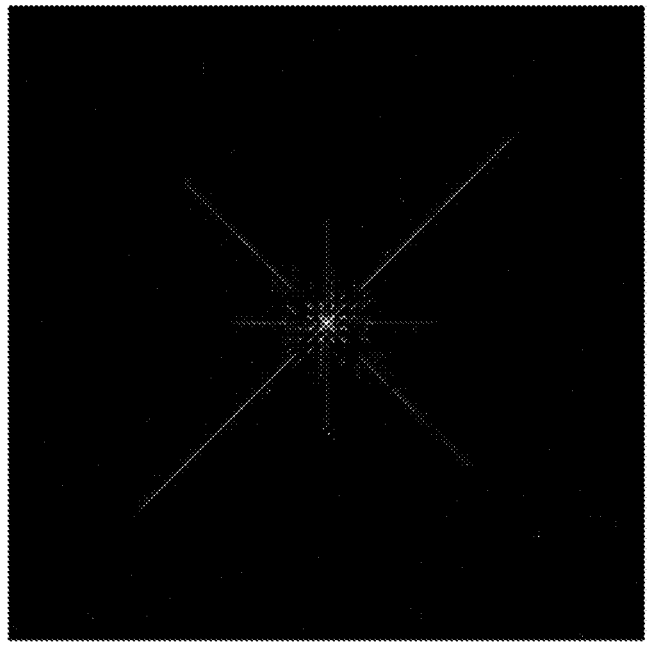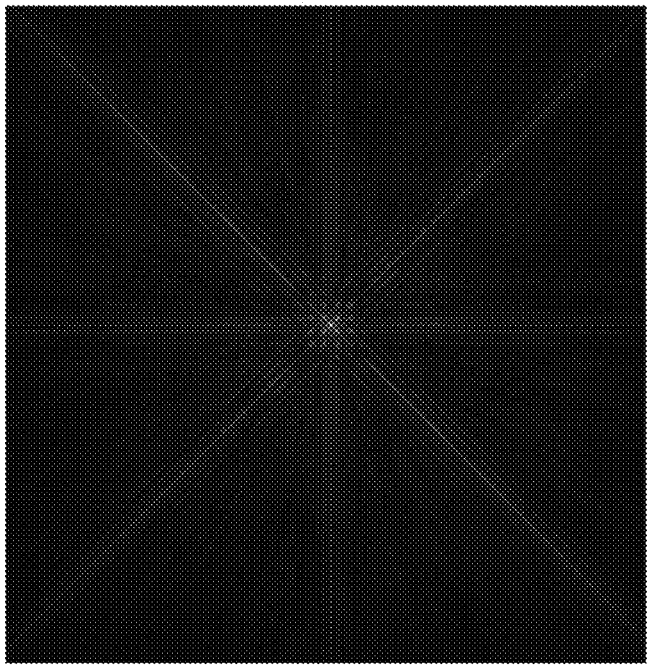
FIG. 13

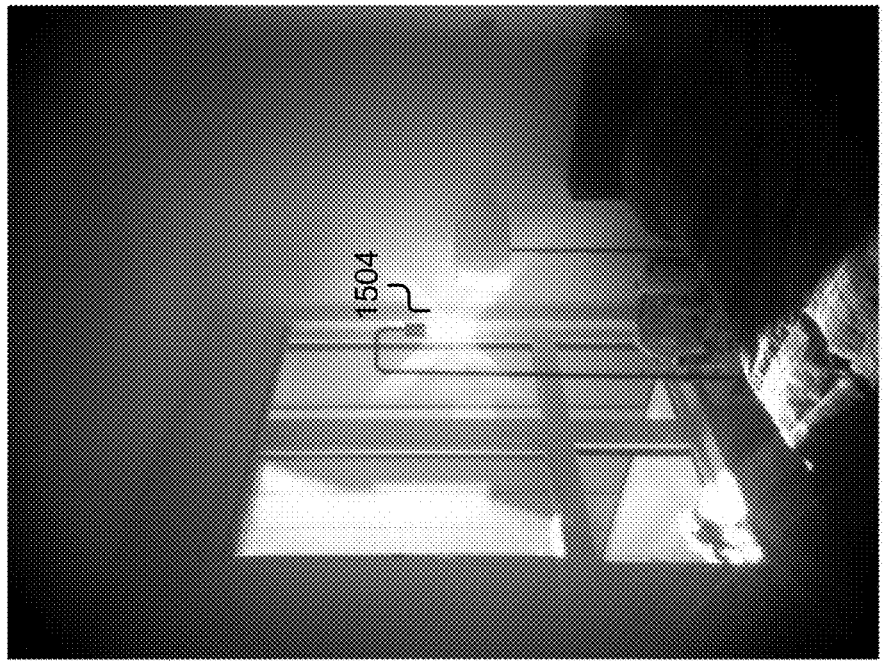
FIG. 15A

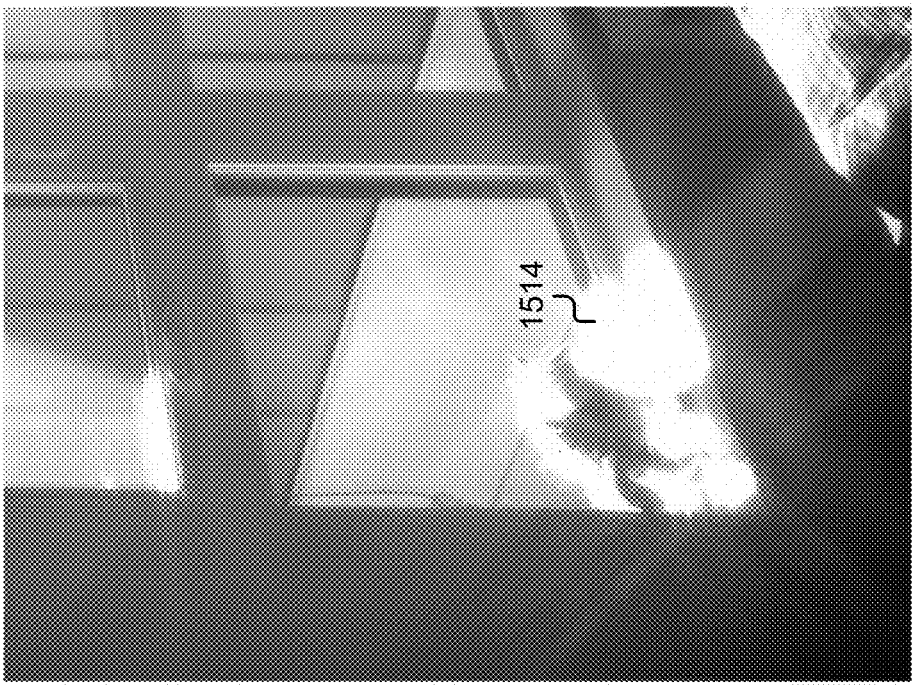
FIG. 15B

FIG. 15C

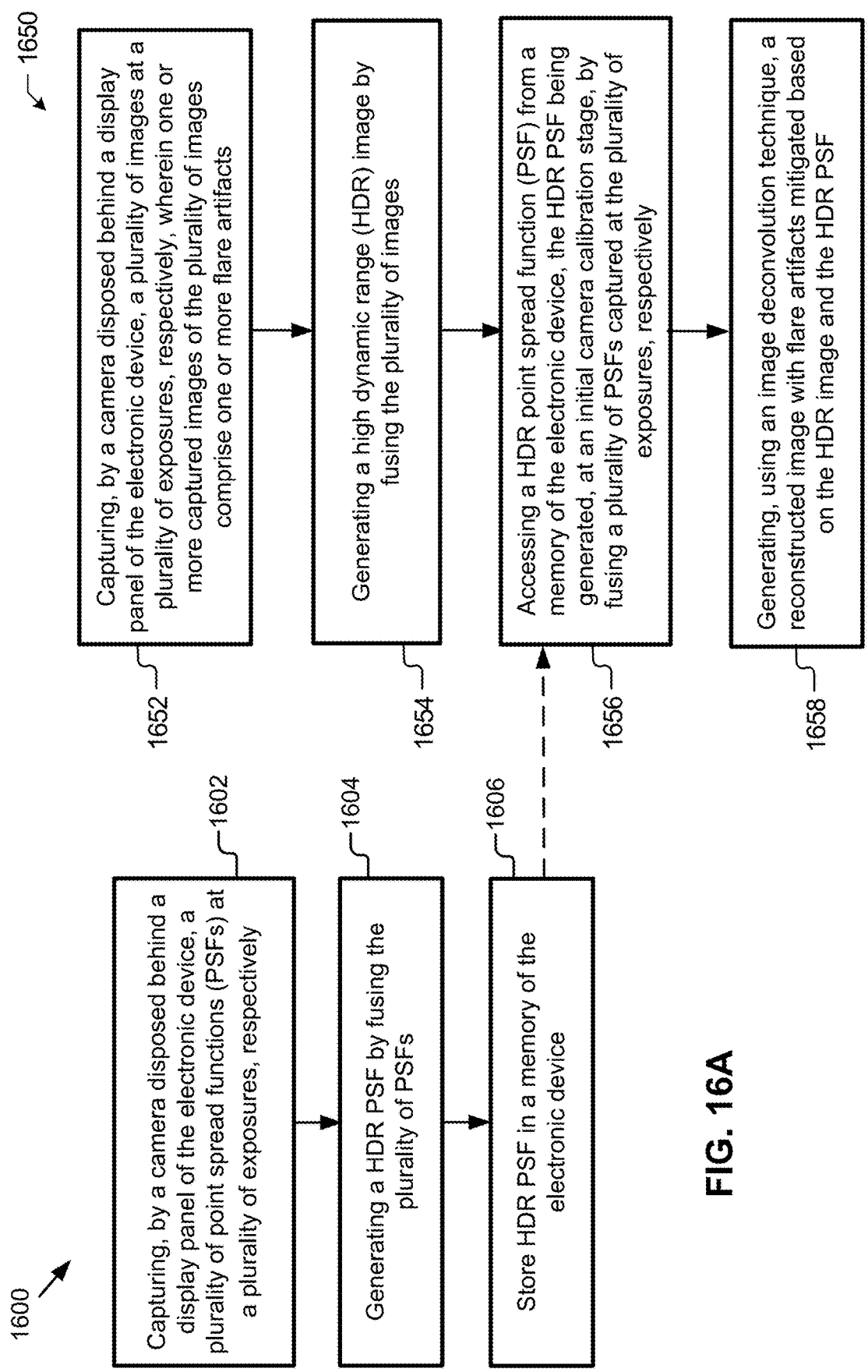

US 11,889,033 B2

FLARE MITIGATION VIA DECONVOLUTION USING HIGH DYNAMIC RANGE IMAGING

TECHNICAL FIELD

This disclosure relates generally to flare mitigation. In particular, the disclosure relates to mitigating or removing flare artifacts (e.g., diffraction flares) from images captured by a camera behind electronic displays.

BACKGROUND

Electronic displays, such as active matrix liquid crystal displays (AMLCDs), active matrix organic light emitting displays (AMOLEDs), and micro-LED displays are typically the types of displays that are deployed for use in personal electronic devices (e.g., mobile phones, tablet computers, smartwatches, and so forth). Such personal electronic devices may generally include a front-facing camera, which may be disposed adjacent to the display, and may be utilized most often by users to capture self-portraits (e.g., "selfies"). However, as front-facing camera systems grow in complexity (e.g., depth cameras), more and more of the area designated for the display of the electronic device may be traded off to expand the area designated for the camera system. This may lead to a reduction in resolution and viewing area of the display. One technique to overcome the reduction in resolution and viewing area of the display may be to dispose the front-facing camera system completely behind or underneath the display panel. However, disposing the front-facing camera system behind the display panel may often degrade images captured by the front-facing camera. For instance, captured images by such under display camera (UDC) systems (i.e., camera system behind the display panel) may often contain flares or flare artifacts. It may be thus useful to provide improved techniques to reconstruct images captured by these UDC systems such that the flares artifacts are mitigated or removed.

BRIEF DESCRIPTION OF THE DRAWINGS

FIG. 5 illustrates application of a prior image reconstruction solution on two example degraded images and corresponding results after application.

FIG. 13 illustrates an example comparison between an example simulated PSF computed using a wave optics process and an example measured PSF generated using a multi-exposure stack measurement and HDR fusion process.

FIGS. 15A-15C illustrate examples of degraded images (e.g., images with flare artifacts) and corresponding reconstructed images with flare artifacts mitigated or removed.

FIG. 16A illustrates a flow diagram of an example method for generating and storing a HDR PSF during an initial or one-time camera calibration stage of an electronic device.

FIG. 16B illustrates a flow diagram of an example method for generating a reconstructed image with flare artifacts mitigated.

DESCRIPTION OF EXAMPLE EMBODIMENTS

Figure 1:
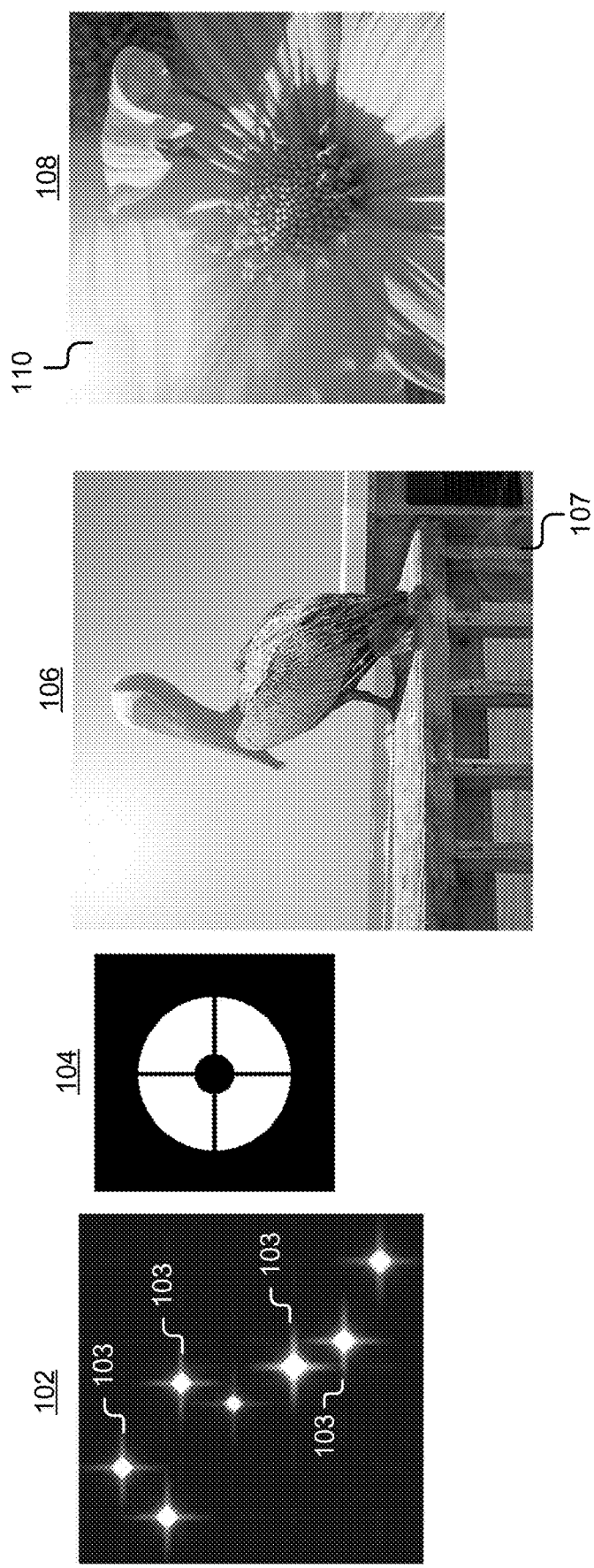
FIG. 1 illustrates examples of different types of flares or lens flare artifacts.

Lens flare artifacts in imaging systems are oftentimes undesired and may severely impact quality of an image. These artifacts typically happen due to the presence of a bright light source in or near the field of view of a camera that captured the image. Depending on the types of flare, light coming from such bright source may be diffracted, reflected, or scattered by different optical elements of the imaging system. FIG. 1 illustrates examples of different types of flares or lens flare artifacts. Specifically, FIG. 1 illustrates an example image 102 with diffraction flares 103 due to aperture shape 104, an example image 106 with ghosting or ghosting flare 107 due to reflection at lens surface, and an example image 108 with veiling flare 110. Particular embodiments discussed herein relates to removing or mitigating diffraction flares (e.g., diffraction flare 103) from images captured using electronic devices, in particular, under display camera (UDC) systems (also sometimes interchangeably referred to herein as camera behind or underneath display panel). One example of such UDC system is shown and discussed in reference to FIGS. 2A and 2B. It should be noted that that the particular embodiments discussed herein for flare mitigation is not limited to the UDC systems and other imaging systems are also possible and within the scope of the present disclosure.

Figure 2A:
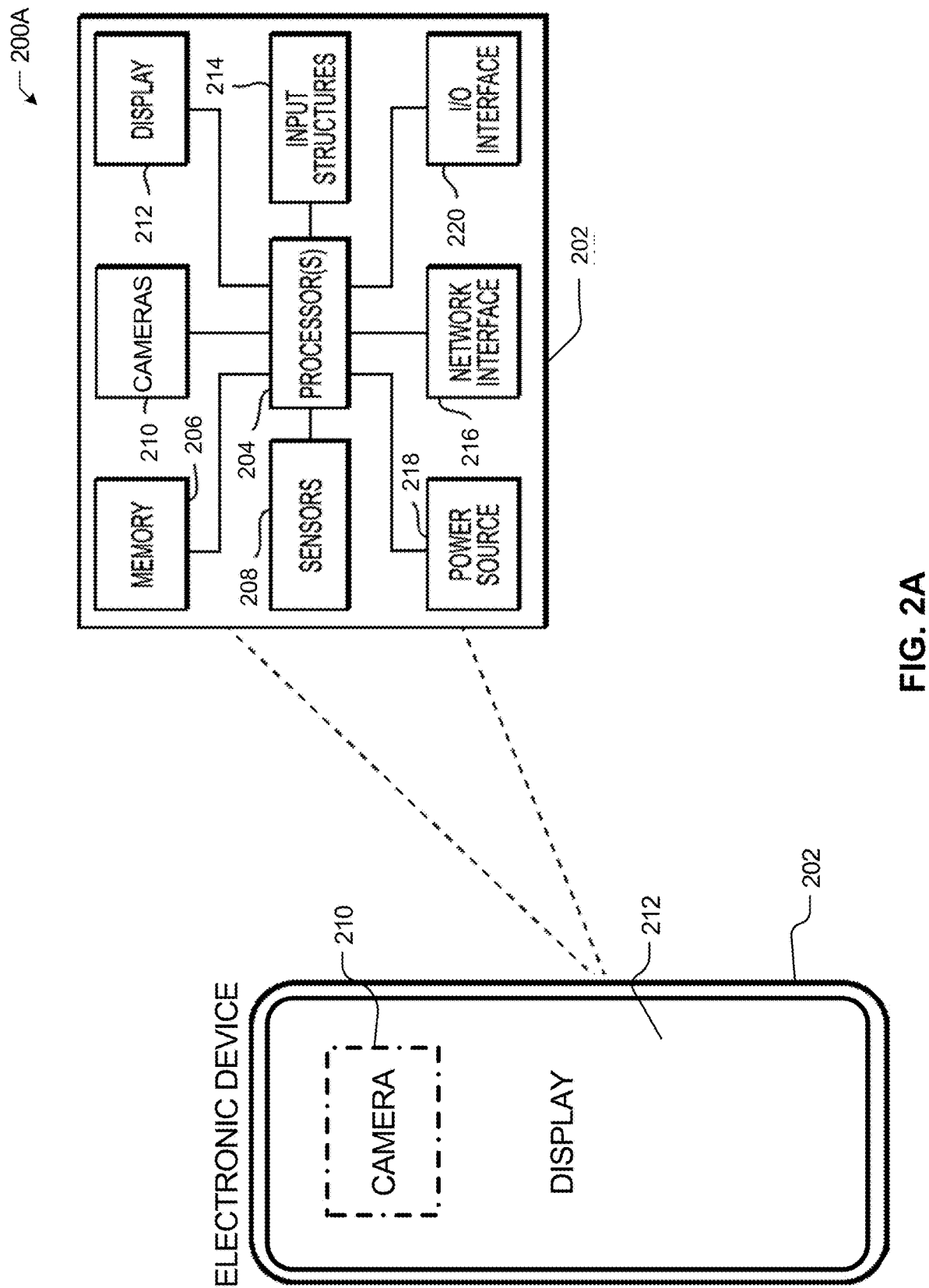
FIG. 2A illustrates an example diagram of an electronic device.

FIG. 2A illustrates an example diagram 200A of an electronic device 202. In particular embodiments, the electronic device 102 represents the UDC system discussed herein. The electronic device 202 may include, for example, any of various personal electronic devices 202, such as a mobile phone electronic device, a tablet computer electronic device, a laptop computer electronic device, and so forth. In particular embodiments, as further depicted by FIG. 2A, the personal electronic device 202 may include, among other things, one or more processor(s) 204, memory 206, sensors 208, cameras 210, a display panel 212, input structures 214, network interfaces 216, a power source 218, and an input/output (I/O) interface 220. It should be noted that FIG. 2A is merely one example of a particular implementation and is intended to illustrate the types of components that may be included as part of the electronic device 202.

In particular embodiments, the one or more processor(s) 204 may be operably coupled with the memory 206 to perform various algorithms, programs, or instructions for flare mitigation. Such programs or instructions executed by the processor(s) 204 may be stored in any suitable article of manufacture that includes one or more tangible, computer-readable media at least collectively storing the instructions or routines, such as the memory 206. The memory 206 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 204 to enable the electronic device 202 to provide various functionalities.

In particular embodiments, the sensors 208 may include, for example, one or more cameras (e.g., depth cameras), touch sensors, microphones, motion detection sensors, thermal detection sensors, light detection sensors, time of flight (ToF) sensors, ultrasonic sensors, infrared sensors, or other similar sensors that may be utilized to detect various user inputs (e.g., user voice inputs, user gesture inputs, user touch inputs, user instrument inputs, user motion inputs, and so forth).

The cameras 210 may include any number of cameras (e.g., wide cameras, narrow cameras, telephoto cameras, ultra-wide cameras, depth cameras, and so forth) that may be utilized to capture various 2D and 3D images. The display panel 212 may include any display architecture (e.g., AMLCD, AMOLED, micro-LED, and so forth), which may provide further means by which users may interact and engage with the electronic device 202. In particular embodiments, as further illustrated by FIG. 2A, one more of the cameras 210 may be disposed behind or underneath (e.g., as indicated by the dashed lines of electronic device 202) the display panel 212 (e.g., one or more of the cameras 210 may be completely concealed by the display panel 212), and thus the display panel 212 may include a transparent pixel region and/or semi-transparent pixel region through which the one or more concealed cameras 210 may detect light, and, by extension, capture images. It should be appreciated that the one more of the cameras 210 may be disposed anywhere behind or underneath the display panel 212, such as at a center area behind the display panel 212, at an upper area behind the display panel 212, or at a lower area behind the display panel 212.

In particular embodiments, the input structures 214 may include any physical structures utilized to control one or more global functions of the electronic device 202 (e.g., pressing a button to power "ON" or power "OFF" the electronic device 202). The network interface 216 may include, for example, any number of network interfaces suitable for allowing the electronic device 202 to access and receive data over one or more cloud-based networks (e.g., a cloud-based service that may service hundreds or thousands of the electronic device 202 and the associated users corresponding thereto) and/or distributed networks. The power source 218 may include any suitable source of power, such as a rechargeable lithium polymer (Li-poly) battery and/or an alternating current (AC) power converter that may be utilized to power and/or charge the electronic device 202 for operation. Similarly, the I/O interface 220 may be provided to allow the electronic device 202 to interface with various other electronic or computing devices, such as one or more auxiliary electronic devices.

Figure 2B:
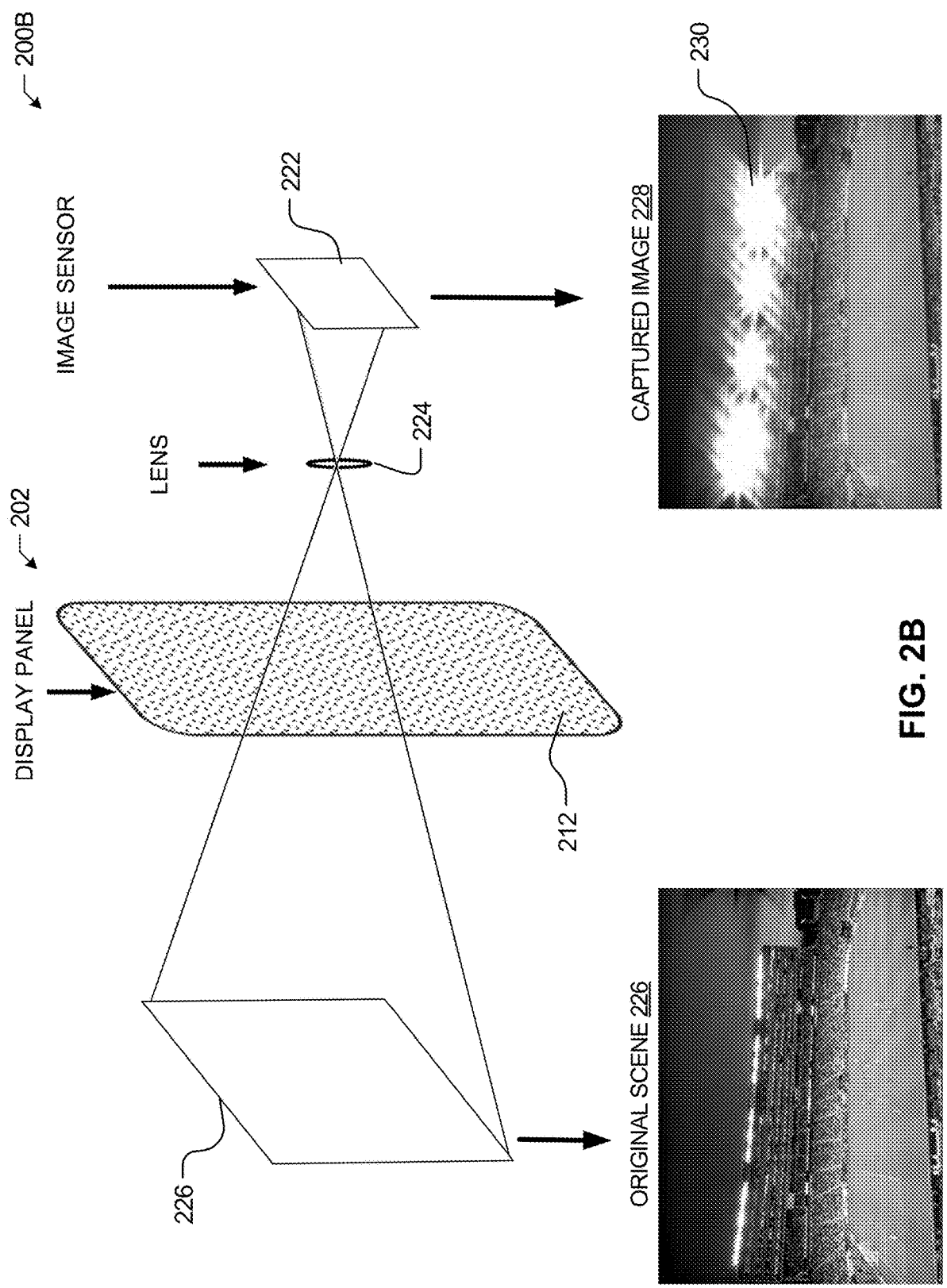
FIG. 2B illustrates an example setup of a camera disposed behind a display of an electronic device for capturing images.
Figure 3:
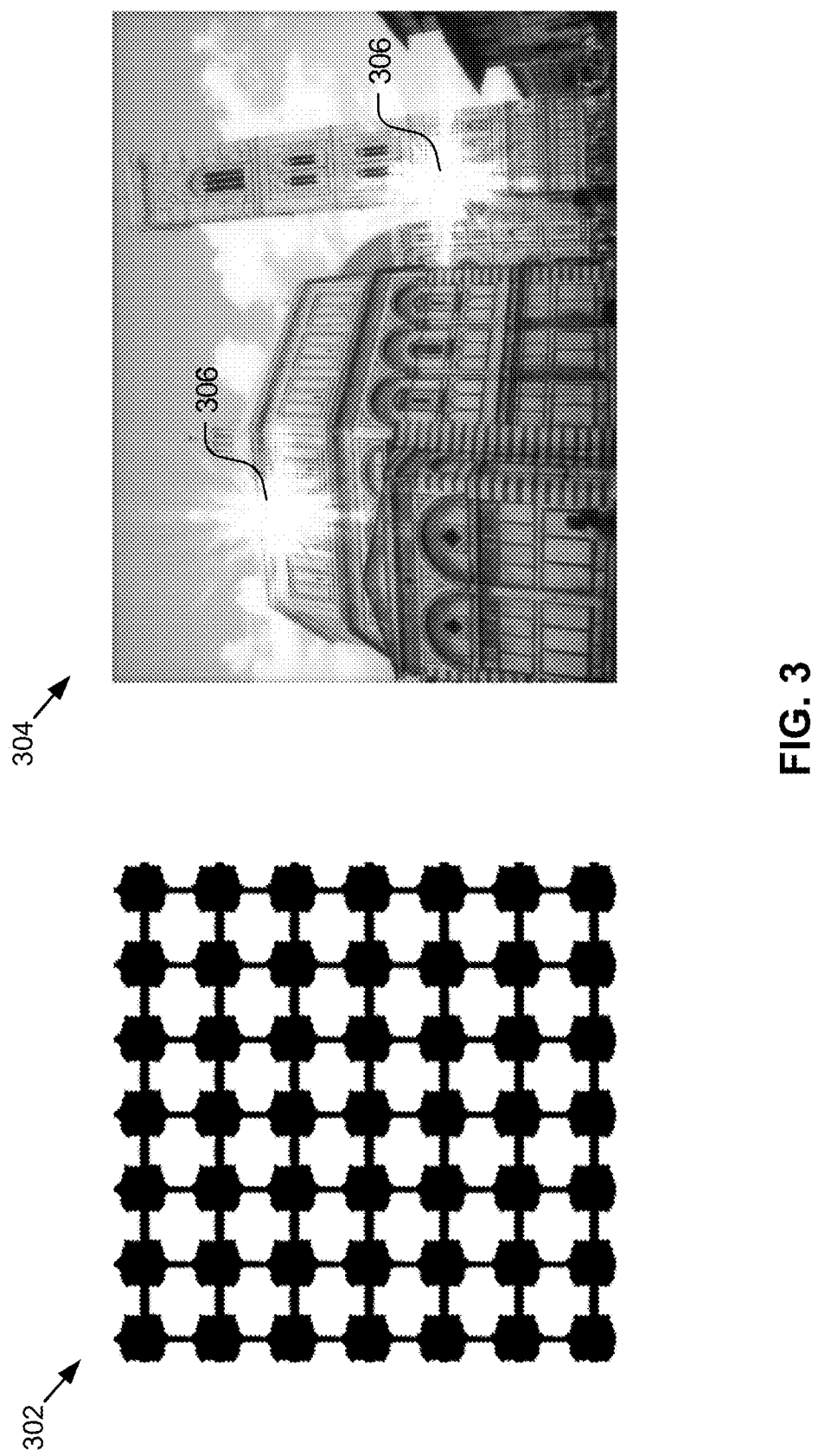
FIG. 3 illustrates an example pixel structure of a display and a corresponding example image containing flares induced by such pixel structure.
Figure 4:
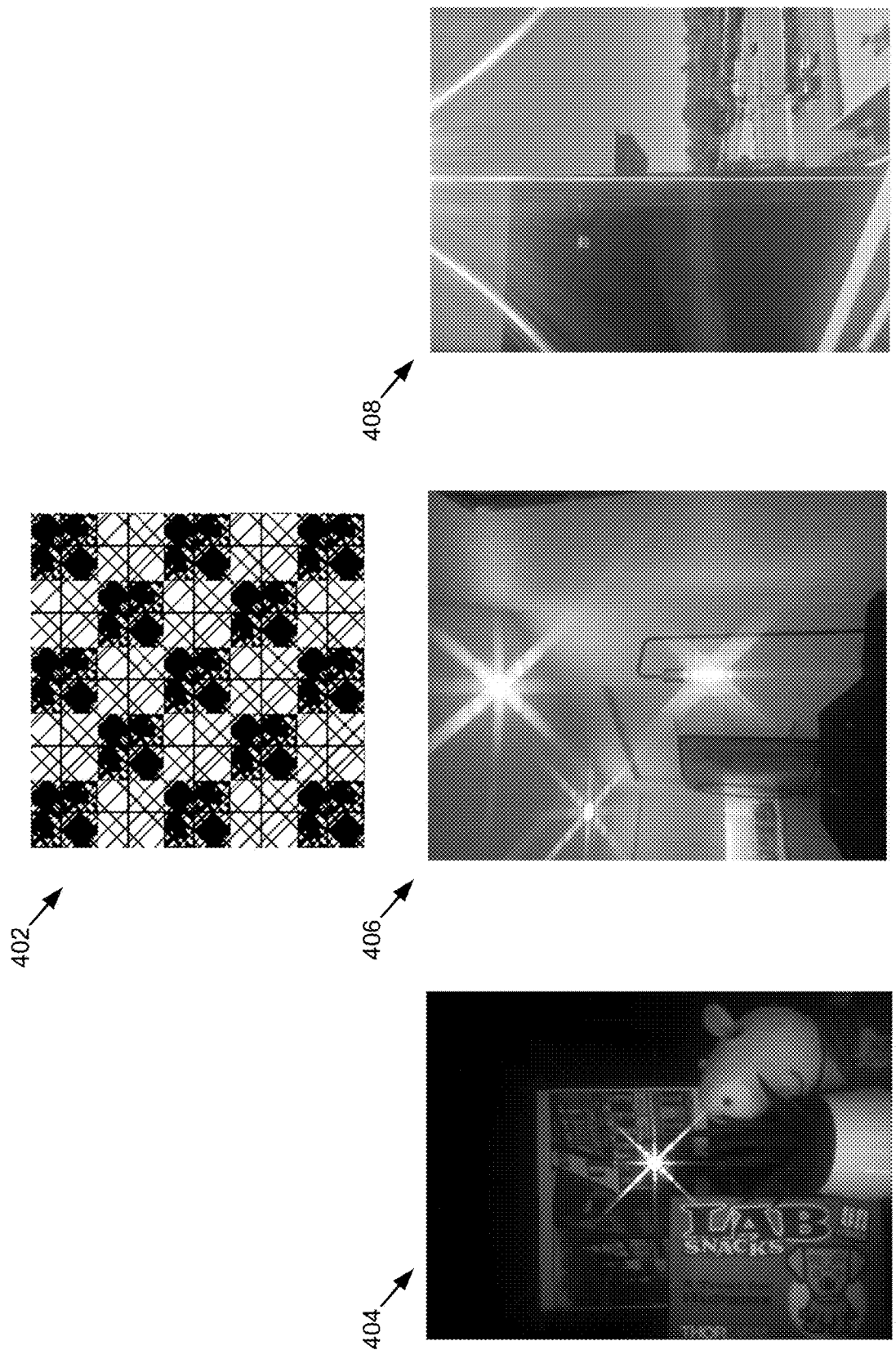
FIG. 4 illustrates another example pixel structure of a display and corresponding example images containing flares induced by such pixel structure.

FIG. 2B illustrates an example setup 200B of a camera disposed behind a display of an electronic device for capturing images, in accordance with the presently disclosed embodiments. Specifically, FIG. 2B shows the setup 200B of the UDC system discussed herein. In particular embodiments, the electronic device 202 may capture, by an image sensor 222 and camera lens 224 disposed behind a display panel 212 of the electronic device 202, an image of a real-world or original scene 226. In particular embodiments, the image of the real-world scene 226 captured by the image sensor 222 may correspond to a captured image 228. In particular embodiments, based on the image of the real-world scene 226 being captured by the image sensor 222 through the display panel 212, the captured image 228 may be degraded (e.g., contain flare artifacts 230). The image 228 captured by camera system (e.g., image sensor 222 and camera lens 224) behind the display panel 212 may be degraded due to diffraction of the pixel structure. For instance, when there is a strong light source in the imaging scene, the display panel 212 in front of the image or camera sensor 222 may lead to severe flare artifacts 230 due to its complex aperture structure. FIGS. 3 and 4 show and discuss two example pixel structures of a display and corresponding images impacted due to these pixel structures.

FIG. 3 illustrates an example pixel structure 302 of a display and a corresponding example image 304 containing flares 306 induced by such pixel structure. In particular embodiments, the pixel structure 302 is a sparse pixel structure 302. The irregular shape of the pixel, periodic arrangement of the pixels, and connecting wires may lead to severe diffraction of the bright light source, which gives the look of the flares 306. In some embodiments, diffraction may occur due to the slight bending or spreading of light waves as it passes around or through small obstacles (e.g., aperture of a camera, display structure in UDC system). The flare artifacts 306 in the image 304 may be the result of light being diffracted by the display structure as it enters the aperture of the camera, such as camera 210 of the electronic device 202. For instance, when there is a light source that is much brighter than the rest of the imaging scene, the source itself as well as its diffracted tails may appear overly bright on the image (e.g., as shown in images 228 or 304). Sometimes the corresponding sensor pixels may even saturate, losing the true information of the light source and its surrounding scene completely.

FIG. 4 illustrates another example pixel structure 402 of a display and corresponding example images 404, 406, and 408 containing flares induced by such pixel structure 402. The images 404, 406, and 408 may be recorded or captured with a UDC system (e.g., camera/image sensor 222 behind a display panel 212), as shown in FIG. 2B. In particular embodiments, the pixel structure 402 is a high-density pixel structure 402. The high-density pixel structure 402 may be relatively more complex than the sparse pixel structure 302. As the aperture structure gets more complex, the flare artifacts may look even more worse, as shown, for example, in images 404, 406, and 408. For instance, the diagonal wires connecting individual pixels in the pixel structure 402 makes solving the flare problem more challenging.

In some embodiments, if the UDC system (e.g., electronic device 202) uses a sparse pixel structure 302, there may be less flare artifacts, however, the display viewing experience may be significantly compromised. Individual pixel cells may be clearly visible to the user. Whereas, if the UDC system uses a high-density pixel structure 402, the display quality may remain the same (e.g., no comprise in image quality, smaller pixel cells may not be visible to the naked eye), but the flare artifacts may be very strong, as shown in images 404, 406, and 408.

Clearly, such flare artifacts in images discussed herein are unwanted in everyday photography experience. Because information of a scene is lost behind these flare tails or artifacts, it may be incredibly hard to get this information back if an image reconstruction is performed. For instance, in a prior image reconstruction solution proposed for UDC systems, degraded images (e.g., blurred or distorted) may be reconstructed via image deconvolution using a point spread function (PSF) measured during image calibration. The PSF may be unique to the display structure and may capture the relationship between a clear image and a degraded image. This solution may be able to remove blurriness and other artifacts from an image. However, this solution itself is not sufficient when it comes to removing or mitigating the flare artifacts. For instance, since some portions of the image has been lost behind the flare tails or artifacts, the degraded image behind the flares may not be fully recovered using the prior image reconstruction solution. By way of an example, FIG. 5 illustrates application of the prior image reconstruction solution on two example degraded images 500 and 510, where the degraded image 500 is blurred and the degraded image 510 contains flare artifacts. It can be seen that the blurriness is fixed or removed in the reconstructed image 502 produced by the prior image reconstruction solution. However, the flare tails do not disappear in the reconstructed image 512 since the prior image reconstruction solution has no information on the house picture behind the flare tails. Therefore, in order to have a UDC system where the display quality is not compromised as well as flare artifacts (e.g., flares, flare tails) in an image are removed or mitigated, an improved image reconstruction solution is needed that can remove or mitigate these flare artifacts in an algorithmic way, as discussed below.

Figure 6:
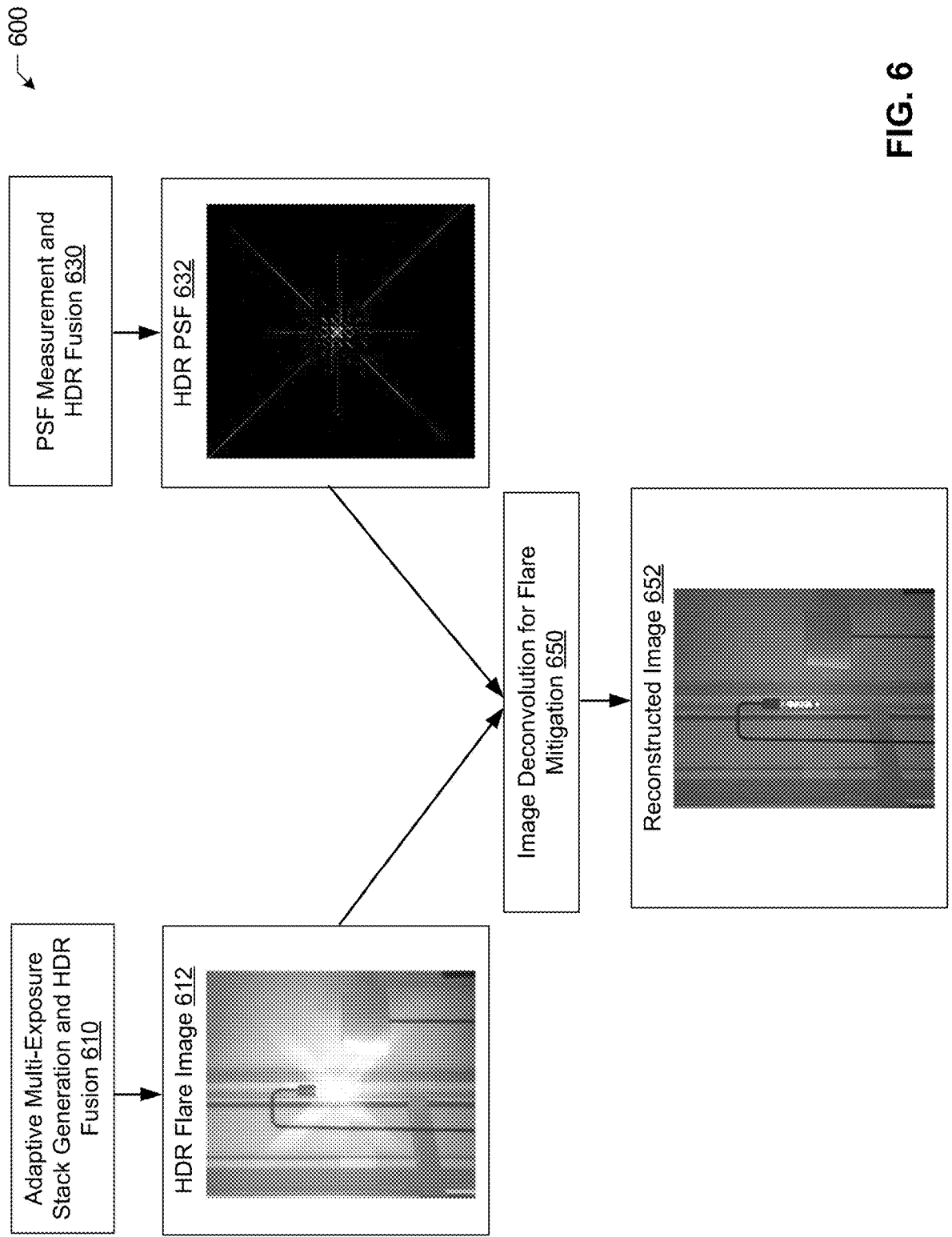
FIG. 6 is a block diagram illustrating high-level steps performed by an improved image reconstruction solution or technique discussed herein for flare mitigation.
Figures 7A, 7B:
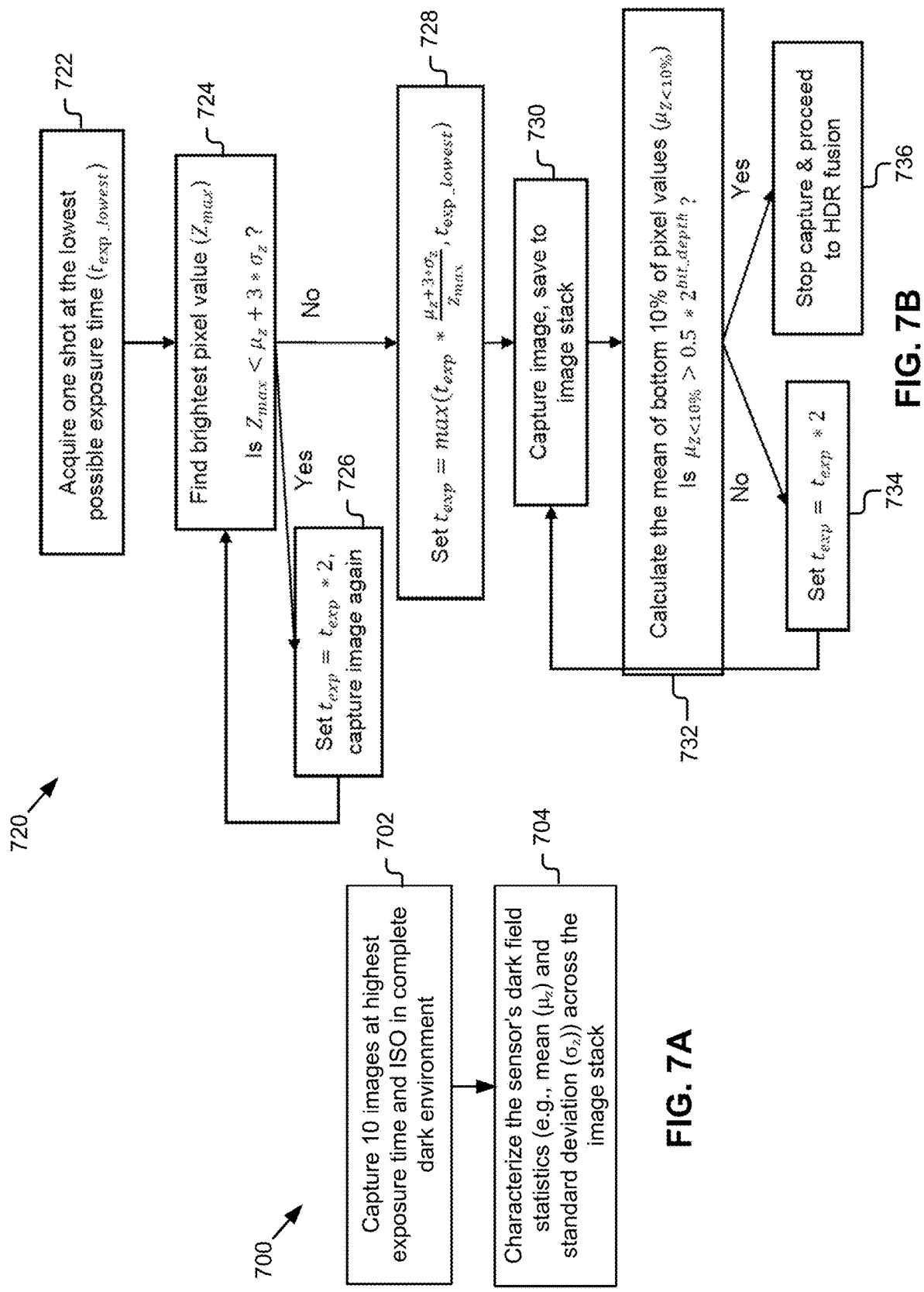
FIG. 7A illustrates an example method or process of image calibration.
FIG. 7B illustrates an example method or process of adaptive multi-exposure image acquisition.
Figure 7C:
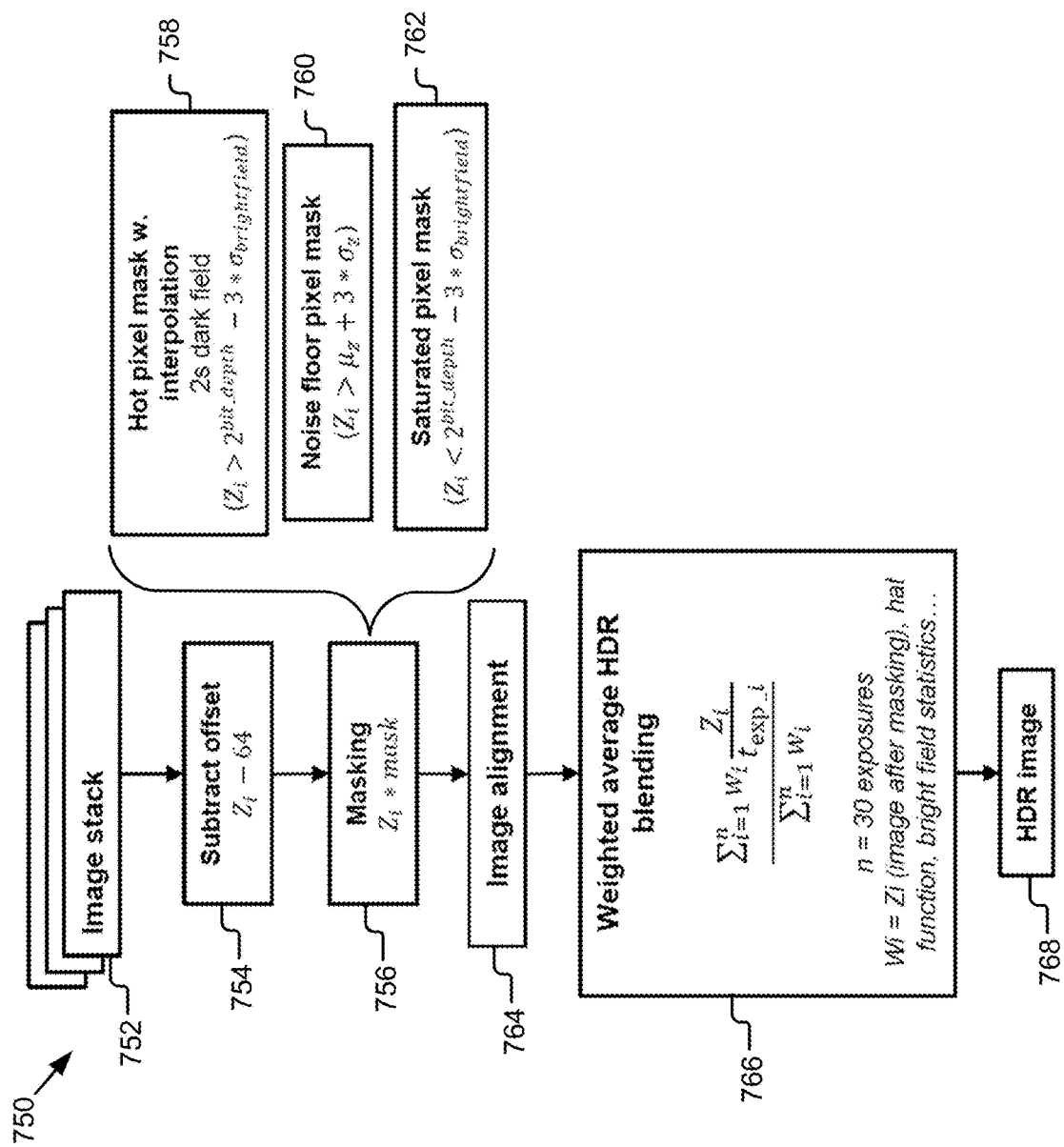
FIG. 7C illustrates an example method or process of high dynamic range (HDR) fusion to generate a HDR image.
Figure 8:
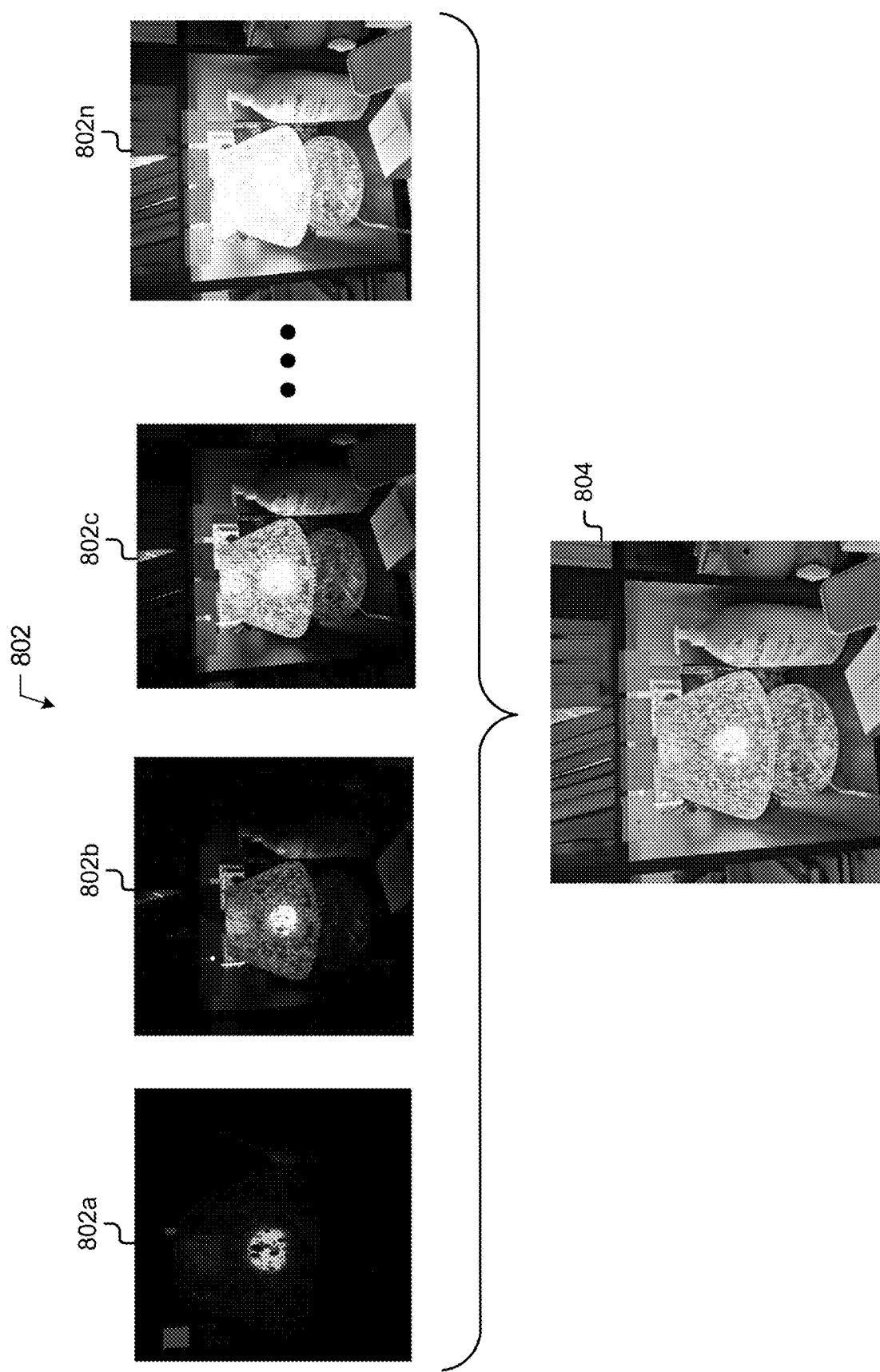
FIG. 8 illustrates an example multi-exposure image stack and an example HDR fused image.

FIG. 6 is a block diagram 600 illustrating high-level steps performed by the improved image reconstruction solution or technique discussed herein for flare mitigation. At step 610, in order to recover the information that is lost due to flare during an image capturing process by an UDC system (e.g., electronic device 202), adaptive multi-exposure stack generation and HDR image synthesis operations are performed. Specifically, step 610 may include one or more processors of the electronic device 202 adaptively determining an exposure time sequence, capturing a desired image stack in a minimal time (e.g., in under 30 ms), and then synthesizing the captured image stack to produce a high dynamic range (HDR) image 612 for flare mitigation. Stated differently, step 610 may include capturing multiple images at different exposures (e.g., exposure times) (e.g., as shown in FIG. 8) and then fusing the captured images into a high dynamic range (HDR) image 612. Some of the ways or techniques by which the HDR image 612 discussed herein may be generated may include, for example and without limitation, (1) "burst photography", in which a series of constant-exposure-time images may be recorded and computationally merged into a higher-bit depth composite, (2) recording a series of images at fixed exposure time but varying electronic gain, (3) adding a pixel-wise attenuation mask in front of the sensor, so that some pixels see an attenuated signal while others see the full illumination (e.g., thereby sacrificing resolution for effective higher bit depth), etc. In particular embodiments, the HDR fusion process (e.g., process 750 of FIG. 7C) may combine the bright area information from low exposure time images and dark area information from high exposure time images. This results in the HDR image 612 that is free from saturation. The resulting HDR image 612 contains the true intensity of the flare pattern, which is crucial for the image reconstruction later on, such as in the image deconvolution process 1400 of FIG. 14. Specific operations and/or steps associated with step 610 are discussed in detail below in reference to at least FIGS. 7A-7C.

Figure 9:
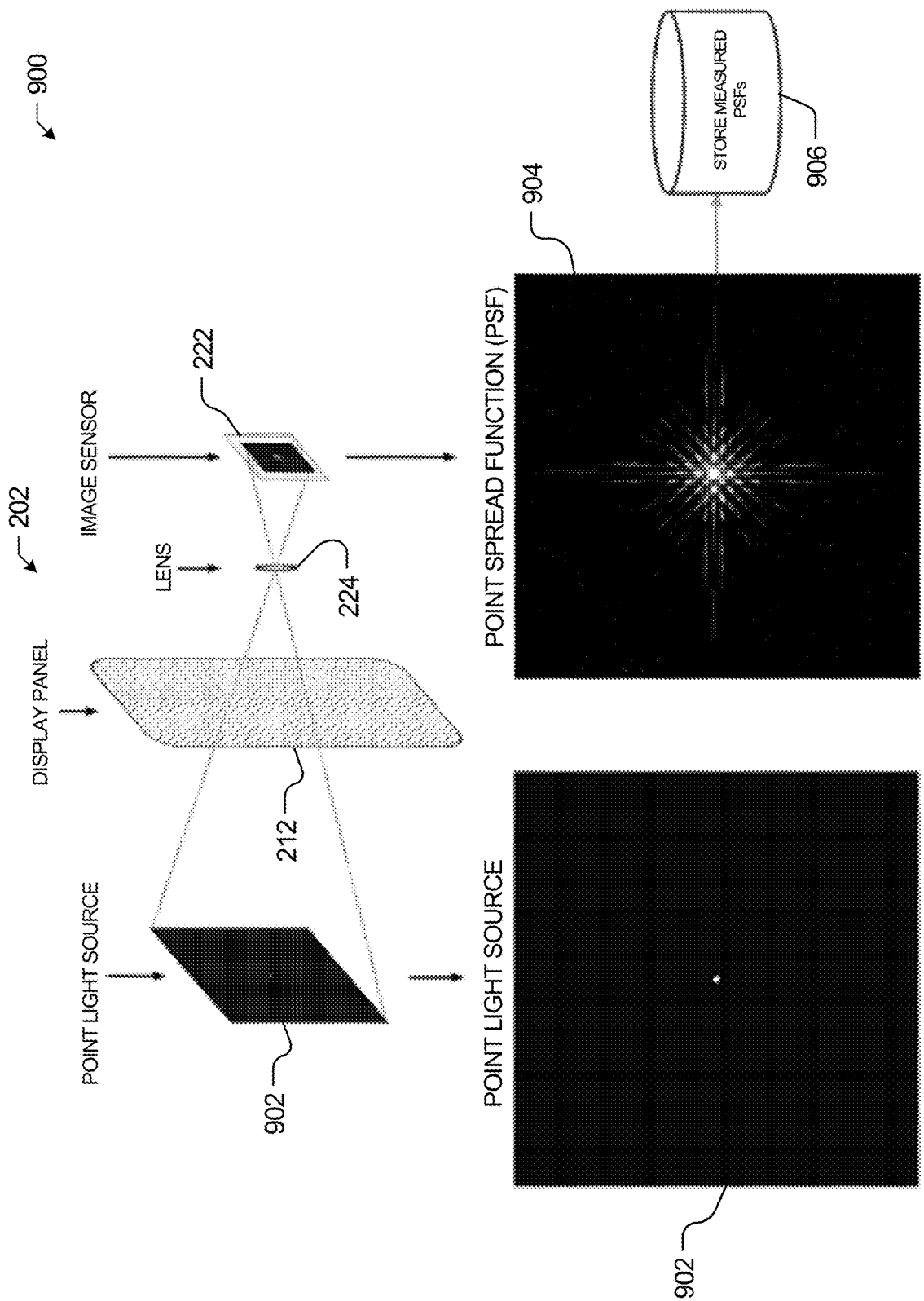
FIG. 9 illustrates an example setup for point spread function (PSF) measurement.

Having the HDR image 612 alone may not be enough to mitigate flare, relationship between a clear image (e.g., image with no flares or flare removed) and a degraded image (e.g., image with flares captured by UDC system) may also be required. This relationship may be defined by the PSF, which describes how does a single point of light get diffracted by the display structure and gets captured by the sensor (e.g., image sensor 222) behind the display (e.g., display panel 212). This PSF may enable to mitigate the flare by recovering the clear light source from the degraded image with flare artifacts. To obtain this PSF, at step 630, PSF measurement and fusion processes/operations may be performed during the initial camera calibration process. Specifically, step 630 may include one or more processors of the electronic device 202 capturing or acquiring a stack of PSF measurements at different exposures (e.g., exposure times) and then performing a similar fusion process (e.g., like step 610) to fuse the images to obtain a HDR PSF 632. In particular embodiments, the HDR PSF 632 that is computed during the initial camera calibration process may be stored in memory (e.g., memory 206) of the electronic device 202 for later access and/or retrieval. For instance, the HDR PSF 632 may be retrieved from the memory for use during the image deconvolution process discussed herein. An example PSF measuring setup is illustrated in FIG. 9. Also, specific operations and/or steps associated with step 630 are discussed in detail below in reference to at least FIGS. 10 and 11.

Given both the HDR image 612 and the HDR PSF 632, at step 650, an image deconvolution process is performed to produce a reconstructed image 652 that is free from flare artifacts or have these artifacts considerably reduced. For instance, as shown in FIG. 6, the reconstructed image 652 does not contain the diffraction flares coming from the bulb as shown in HDR Flare image 612. FIGS. 15A-15C illustrate some additional examples of degraded images (e.g., images with flare artifacts) and corresponding reconstructed images with flare artifacts mitigated/removed after performing the steps 610, 630, and 650 discussed herein. In particular embodiments, image deconvolution step 650 may include inverting the image degradation process. Specific operations and/or steps associated with step 650 are discussed in detail below in reference to at least FIG. 14. Each of the steps 610, 630, and 650 is discussed in detail below in the following sections.

In particular embodiments, the improved image reconstruction solution or technique for flare mitigation discussed herein is advantageous in several aspects. By way of examples and without limitation, (1) the improved solution or technique allows for capturing everyday scene without the disruption of flare artifact with a UDC device (e.g., electronic device 202), (2) by mitigating the flare artifact algorithmically (e.g., as discussed in FIGS. 7A-7C, 10, and 14), the UDC system (e.g., electronic device 202) may be enabled to use a much higher quality display without comprising the user's viewing experience, (3) since the display quality is maintained, the improved solution or technique further allows the camera (e.g., camera 210) to be positioned in the center behind display (e.g., display 212), enabling better video chatting experience, such as eye to eye communication, and (4) the improved solution or technique may further enable positioning of camera behind laptop and television screen, which enhance video conference experience. It should be noted that the improved image reconstruction solution or technique for flare mitigation discussed herein is crucial for achieving both real time image reconstruction and high quality still captured mode, while maintaining the high display quality on portable electronic devices, such as smartphone devices.

Adaptive Multi-Exposure Stack Measurement and High Dynamic Range (HDR) Image Synthesis To capture all of the flare intensity information in the high dynamic range (HDR) image 612, multiple images have to be taken at different exposures (e.g., exposure times) and then fused together. The exact exposure time sequence may have to be determined adaptively based on the lightning condition. FIGS. 7A-7C illustrate example flowcharts of methods or processes for adaptive multi-exposure stack measurement and HDR image synthesis to obtain a HDR image. Specifically, FIG. 7A illustrates an example image calibration process 700. FIG. 7B illustrates an example adaptive multi-exposure image acquisition process 720. FIG. 7C illustrates an example HDR fusion process 750. In particular embodiments, the processes 700, 720, and 750 may be performed in sequence (e.g., starting with process 700 and ending with process 750) to obtain the HDR image 612. It should be noted that these processes 700, 720, and 750 are part of the high-level step 610 discussed above. That is, step 610 comprises of the processes 700, 720, and 750, each of which is now discussed below.

FIG. 7A illustrates an example method or process 700 of image calibration. The image calibration process 700 may be performed once at the beginning to adjust camera settings with which to capture an image stack (e.g., set of images) later on, such as in the multi-exposure image acquisition process 720. At step 702, one or more processing devices (e.g., one or more processors 204 of the electronic device 202) may capture a certain number of images (e.g., 10 images) at highest exposure time and ISO (e.g., sensor's 222 sensitivity to light) in complete dark environment. Next, at step 704, the one or more processing devices may characterize the sensor's dark field statistics (e.g., mean–$\mu_z$, standard deviation (std)–$\sigma_z$) across the image stack that will be captured in the image acquisition process 720. Stated differently, step 704 may include determining a noise floor level (mean $\mu_z$) and its standard deviation ($\sigma_z$). Any pixel value in an image that is three $\sigma_z$ away from the noise floor $\mu_z$ may be deemed to be signal that contains valid information, as discussed in further detail below in the adaptive multi-exposure image acquisition process 720.

FIG. 7B illustrates an example method or process 720 of adaptive multi-exposure image acquisition. The adaptive multi-exposure image acquisition process 720 may begin, at step 722, with a camera (e.g., camera 210 of the electronic device 202) capturing a first image at the lowest possible exposure (e.g., exposure time) t ($t_{exp\_lowest}$). This guarantees that the flare source does not saturate in the image. Next, at step 724, one or more processing devices (e.g., one or more processors 204 of the electronic device 202) may determine the brightest pixel value ($Z_{max}$) within the first image that is captured with the lowest exposure (e.g., exposure time). If $Z_{max}$ is smaller than a certain threshold (e.g., three $\sigma_z$ away from the noise floor $\mu_z$), then the one or more processing devices may determine the first image to be too dark and does not contain any useful information. Therefore, at step 726, the one or more processing devices may increase the exposure (e.g., exposure time ($t_{exp}$)) by a factor of 2 and then repeat the step 724 until the brightest pixel value ($Z_{max}$) is barely above the noise floor level ($\mu_z$) in the darkest image, such as the image 802a shown in FIG. 8. Once $Z_{max}$ is determined to be larger than the threshold, at step 728, the one or more processing devices may scale the exposure time ($t_{exp}$) such that the brightest pixel value is right above the noise floor. This helps to ensure that the maximum range of the flare source is captured.

Once the exposure (e.g., exposure time ($t_{exp}$)) has been properly scaled, at step 730, the camera (e.g., camera 210 of the electronic device 202) may start capturing images by doubling exposure (e.g., exposure time ($t_{exp}$)) each time (e.g., as shown in step 734) and the one or more processing devices may save the captured images to an image stack. In some embodiments, the factor of two is chosen here to optimize the number of images taken and having sufficient information for HDR fusion process 750. In particular embodiments, images may be captured and saved to the image stack until the brightest image in the image stack is sufficiently bright such that no information is lost even for the darker areas of the image, such as the image 802n shown in FIG. 8. In particular embodiments, the one or more processing devices may guarantee this by examining or calculating, at step 732, the mean value of the bottom 10% of all pixel values (e.g., $\mu_z$<10%). In one embodiment, $\mu_z$<10% needs to be brighter than half of the highest possible pixel value (e.g., $2^{bit\_depth}$) By way of a non-limiting example, if the image sensor 222 in the electronic device 202 is a 10-bit sensor, then the brightest pixel value is 1023. In this example, $\mu_z$<10% needs to be brighter than half of 1023.

Once it is determined that the mean value of the bottom 10% of all pixel values ($\mu_z$<10%) is greater or brighter than half of the highest possible pixel value ($2^{bit\_depth}$), then at step 736, the one or more processing devices may stop the capturing process and proceed to the HDR fusion process 750. Otherwise, the one or more processing devices, at step 734, doubles the exposure (e.g., exposure time ($t_{exp}$)) and continues to capture and save image(s) to the image stack.

FIG. 7C illustrates an example method or process 750 of HDR fusion (i.e., fusing captured images at different exposures into a HDR image). The HDR fusion process 750 may begin, at step 752, with the stack of images that was generated from the adaptive multi-exposure image acquisition process 720. At step 754, one or more processing devices (e.g., one or more processors 204 of the electronic device 202) may apply an offset to the sensor output. In particular embodiments, step 754 may include offsetting all pixel values by a particular value (e.g., 64). Stated differently, an offset may be subtracted from each pixel value ($Z_i$) before further processing. It should be noted that offsetting may not always be required. For instance, many imaging sensor chips tend to add a default offset for the pixel values they capture. In the case discussed herein, the smallest pixel value is 64. That is why, at step 754, pixel values are offset by 64. However, if the imaging sensor chip does not add this default offset (i.e., smallest pixel is 0), then step 754 is no longer necessary. At step 756, the one or more processing devices may perform a masking operation. The masking operation may include applying or creating three different masks that may be used to select pixels to be used for HDR fusion. For instance, at step 758, the one or more processing devices may apply or create a hot pixel mask by selecting pixels close to saturation (e.g., filter out defective pixels) when a long exposure (e.g., two second) complete dark image is taken. These pixels may be deemed as defective and interpolation may be required from nearby pixel to fill in their values. At step 760, the one or more processing devices may apply or create a noise floor pixel mask that guarantees that all pixels used are above the noise floor level and contains valid information. At step 762, the one or more processing devices may apply or create a saturated pixel mask that guarantees that saturated pixels are not included in the fusing or blending step 766. In some embodiments, all masks (i.e., hot pixel mask, noise floor pixel mask, and saturated pixel mask) may be applied to every image of the multi-exposure image stack obtained from the adaptive multi-exposure image acquisition process 720. At step 764, the one or more processing devices may perform an image alignment step. The image alignment step may be applied as needed. For instance, since user's hand motion while capturing image(s) may cause misalignment across the multi-exposure image stack, image alignment may be performed to resolve or correct this misalignment. It should be noted that the steps 754, 756, 758, 760, 762, and 764 may be optional steps and may not be performed at all times during the HDR fusion process 750. For instance, after receiving the image stack in step 752, the HDR fusion process 750 may directly proceed to step 766 to fuse or blend the images, as discussed below. In some embodiments, one or more of the steps 754, 756, 758, 760, 762, and 764 may be performed before proceeding to step 766. In other embodiments, each of the steps 754, 756, 758, 760, 762, and 764 may be performed prior to step 766.

At step 766, the one or more processing devices may determine, for each image of image stack, pixel intensity data for each of a plurality of pixel locations of the image. The pixel intensity data may be associated with an exposure (e.g., exposure time) of the respective image. In particular embodiments, determining the pixel intensity data may include computing, for each pixel location of the plurality of pixels locations of the image, a ratio between a pixel value ($Z_i$) and its corresponding exposure time ($t_{exp\_i}$). This ratio may represent the amount of light energy the pixel receives per unit of time. For each pixel location (x, y), such ratio then gets combined in a weighted average fashion across the image stack. For instance, for each pixel location, a weighted average pixel intensity value may be calculated based on the pixel intensity data and the exposure (e.g., exposure time) for the respective pixel location over the plurality of images in the image stack. The weighting function may take on various forms, including but not limited to, the pixel value ($Z_i$) itself, a hat function, signal-to-noise ratio (SNR) measurement from bright field statistics, etc. The weighted average pixel intensity value, computed in step 766, may give the relative intensity/irradiance for each pixel location, which serves as the HDR image needed for flare mitigation. Stated differently, the weighted average HDR blending step 766 may result into the HDR image 768, such as the HDR image 612 shown in FIG. 6 or the HDR fused image 804 shown in FIG. 8. In some embodiments, processing time for the HDR fusion process 750 discussed herein is marginal and may be ignored, as there are no computationally complex steps involved in the pipeline.

FIG. 8 illustrates an example multi-exposure image stack 802 and an example HDR fused image 804. As depicted, the multi-exposure image stack 802 includes a plurality of images 802a, 802b, 802c, . . . , 802n captured at a plurality of exposures (e.g., exposure times), respectively. These images may be captured using the adaptive multi-exposure image acquisition process 720 of FIG. 7B. For instance, the multi-exposure image acquisition process 720 may begin with first capturing image 802a, which is the darkest image here with its brightest pixel (e.g., flare source) barely above the noise floor level and stops capturing at image 802n, which is the brightest image in the image stack. The image 802n is sufficiently bright such that no information is lost even for the darker areas of the image. In particular embodiments, it has been noted that the time taken for capturing the multi-exposure stack (e.g., image stack 802) using the adaptive multi-exposure image acquisition process 720 is no longer than 30 ms. The HDR fusion process 750 of FIG. 7C may blend or fuse these images 802a, 802b, 802c, . . . , 802n to produce the HDR image 804.

Point Spread Function (PSF) Measurement and High Dynamic Range (HDR) Fusion

As discussed elsewhere herein, having the HDR fused image (e.g., HDR image 804, HDR image 612, or HDR image 768) alone may not be enough to mitigate flare. In order to mitigate flare, information regarding how a clear light source got diffracted by the display mask (e.g., display panel 212 of the electronic device 202) to become flare may also be required. This information is characterized by a point spread function (PSF), as discussed elsewhere herein. The PSF may describe how does a single point of light gets diffracted by the display (e.g., display panel 212) and is then captured by the sensor (e.g., image sensor 222) behind the display. During imaging, every pixel of the scene experiences this diffraction process and hence creates the degraded look of the captured image (e.g., captured image 228 shown in FIG. 2B). As shown in the captured image 228, the flare artifact 230 is especially severe to the high intensity of the light source.

In particular embodiments, the PSF may be measured during a one-time camera calibration process, such as the camera calibration process 700 shown and discussed in reference to FIG. 7A. FIG. 9 illustrates an example setup 900 for PSF measurement. In particular embodiments, as depicted by FIG. 9, a point light source 902 (e.g., a white LED or an array of white LEDs) may emit a light wave into the direction of the electronic device 202 through, for example, a pinhole or other imperceptibly small aperture. The point light source 902 (e.g., a white LED light) may be placed behind a pinhole (~100 um in diameter) and at a certain imaging distance away from the UDC system (e.g., display+camera). In particular embodiments, the light wave from the point light source 902 may pass through, for example, the display panel 212, the camera lens 224, and may be ultimately detected by the image sensor 222.

In particular embodiments, the electronic device 202 may measure the one or more PSFs 904 for each of the RGB color components and/or one or more particular monochromatic color components based on, for example, a sampling of a transfer function corresponding to an effect of the display panel 212 in response to the point light source 902. For example, in particular embodiments, the one or more PSFs 904 of the electronic device 202 may represent the intensity response of the point light source 902. Note that the surrounding environment has to be completely dark for the PSF measurement to take place. This may usually be achieved by using an optical chamber or covering the setup 900 with optically black cloth. In particular embodiments, the electronic device 202 may store the one or more measured PSFs 904 into, for example, in a database 906 to be later utilized, such as during the image deconvolution process 650 or 1400 for reconstructing a flare mitigated image.

In order to capture the PSF with its full dynamic range i.e., to generate a HDR PSF (e.g., HDR PSF 632), a multi-exposure stack measurement process and then a HDR fusion process may be performed. The multi-exposure stack measurement process and the HDR fusion process for generating the HDR PSF are similar to the adaptive multi-exposure image acquisition process 720 and the HDR fusion process 750, and therefore the description for these processes will not be repeated here.

Figure 10:
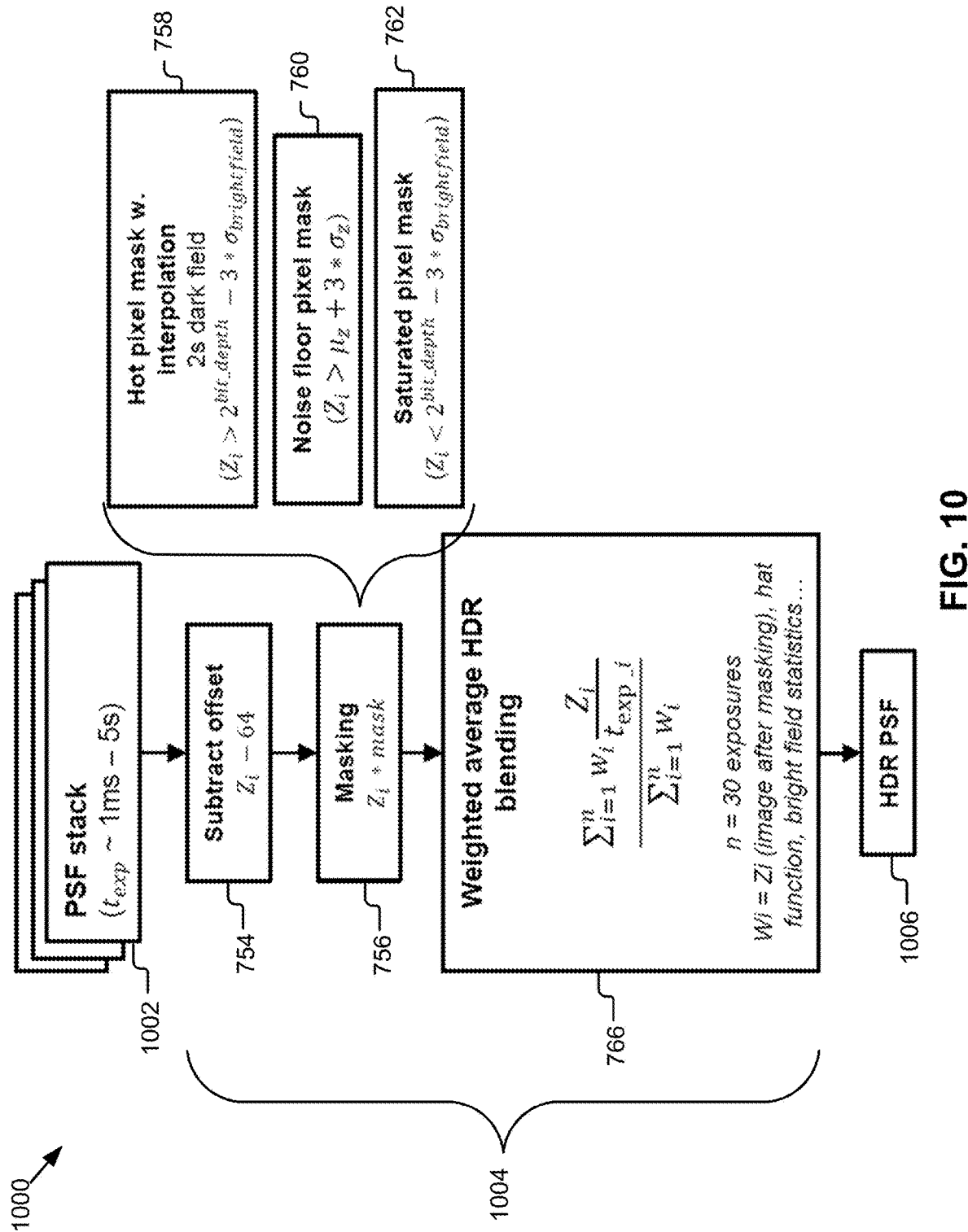
FIG. 10 illustrates an example method or process for generating a HDR PSF.

FIG. 10 illustrates an example process 1000 for generating a HDR PSF. The process 1000 may begin, at step 1002, with a stack of PSF images captured at different exposures (e.g., exposure times) using the setup 900 and a multi-exposure stack measurement process. The multi-exposure stack measurement process may be similar to the adaptive multi-exposure image acquisition process 720 discussed in FIG. 7B. Depending on the display structure (e.g., display structure 302 or display structure 402) and the sensor bit depth, the optimal sequence of the exposure times may vary. For instance, the exposure time ($t_{exp}$) may range between ~1 ms to 5 s. In some embodiments, the exact sequence may be determined experimentally. In particularly embodiments, when generating the PSF stack (e.g., PSF stack 1102), a general rule of thumb is that the brightest pixel in the darkest image (e.g., smallest $t_{exp}$) should be right above the noise floor (e.g., $Z_{max} > \mu_z + 3*\sigma_z$), as shown for example in image 1102a in FIG. 11, and there should be at least three diffraction lobes visible in the brightest image (e.g., largest $t_{exp}$), as shown for example in image 1102n in FIG. 11. In other words, the multi-exposure stack measurement process for PSF stack begins with capturing the darkest image 1102a having its brightest pixel above noise floor and ends with capturing the image 1102n with at least three diffraction lobes visible. The rest of the images in-between $t_{exp}$ may be separated by a factor of two, as discussed in step 734 in FIG. 7B.

Figure 11:
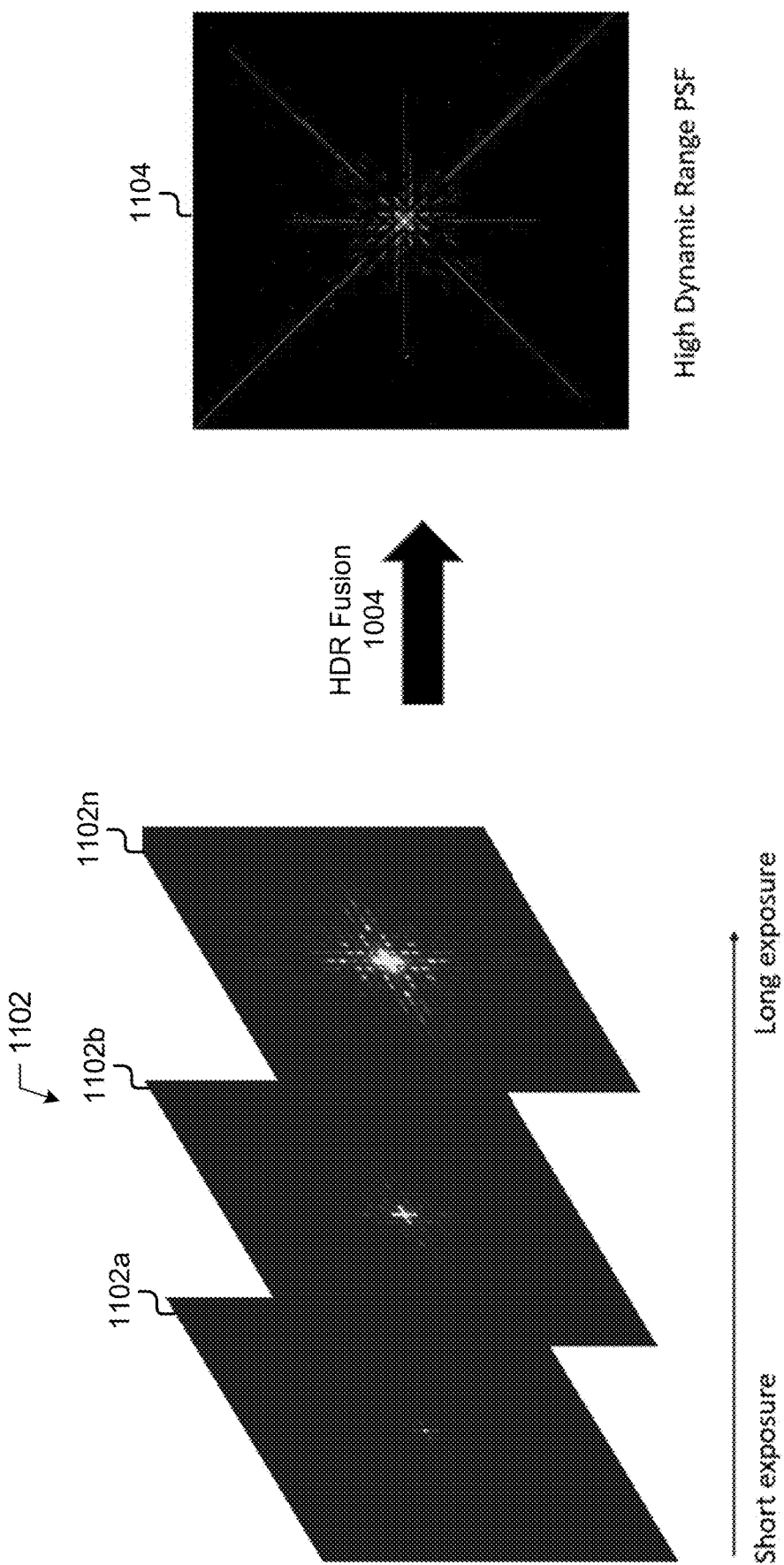
FIG. 11 illustrates an example PSF stack and an example HDR PSF.

After acquiring the desired multi-exposure PSF stack (e.g., PSF stack 1102), HDR PSF fusion process 1004 may be performed to output or generate, at step 1006, a HDR PSF, such as the HDR PSF 1104 shown in FIG. 11. The HDR PSF fusion process 1004 may include same or similar steps as already discussed in the HDR fusion process 750 of FIG. 7C, and therefore the description for these steps will not be repeated here.

FIG. 11 illustrates an example PSF stack 1102 and an example HDR PSF 1104. As depicted, the PSF stack 1102 includes a plurality of PSF images 1102a, 1102b, . . . , 1102n captured at a plurality of exposures (e.g., exposure times), respectively. In some embodiments, these PSF images may be captured using the adaptive multi-exposure image acquisition process 720 of FIG. 7B. For instance, the multi-exposure image acquisition process 720 may begin with first capturing image 1102a, which is the darkest image here with its brightest pixel (e.g., flare source) barely above the noise floor level (e.g., $Z_{max} > \mu_z + 3*\sigma_z$) and stops capturing at image 1102n with at least three diffraction lobes visible. The HDR PSF fusion 1004 may blend or fuse these images 1102a, 1102b, . . . , 1102n to produce the HDR PSF 1104.

In certain situations, measuring the PSF as discussed above may not be an ideal approach due to the requirement for optic equipment (e.g., as shown and discussed in FIG. 9) or project time constraint. In some alternative embodiments, PSF may also be simulated numerically given the design of the pixel display. Light propagation and diffraction are both physics-based processes that may be processed by a set of equations, as shown and discussed later below. If the structure of the display is known (e.g., whether the display structure is a sparse display structure 302 or a high-density display structure 402), how does a single point of light gets propagated and diffracted in the UDC system (e.g., UDC system 200B) may be modeled. This gives a simulated PSF (e.g., simulated PSF 1302) that may be sufficient close to the measured PSF (e.g., measured PSF 1304).

The simulated PSF should be sufficient for use in the image deconvolution process (e.g., shown and discussed in FIG. 14) for flare mitigation in most cases.

Figure 12:
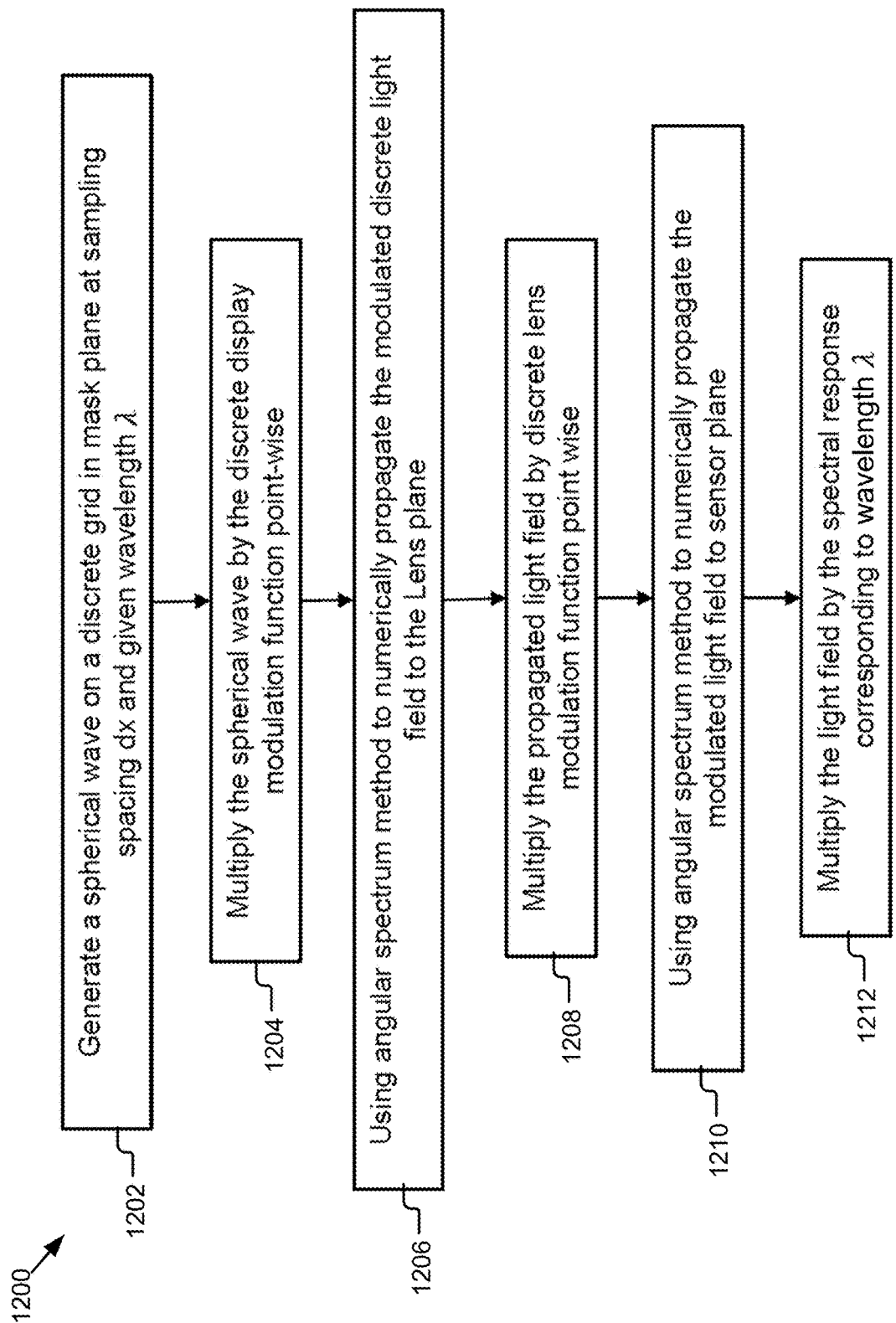
FIG. 12 illustrates an example method or process 1200 computing a simulated PSF with wave optics.

FIG. 12 illustrates an example method or process 1200 for computing a simulated PSF with wave optics. The process 1200 may begin with one or more processing devices (e.g., one or more processors 204 of the electronic device 202), at step 1202, generating a spherical wave (also interchangeably referred to herein as a light field) on a discrete grid in a mask plane at sampling spacing dx and given wavelength A. The light field on the mask plane, generated from a point, may be given by the following equation:

$$O_{m0}(x_m, y_m, \lambda) = \frac{O(0, 0, \lambda)}{j\lambda z_o} \exp\left[\frac{j\pi}{\lambda z_o}(x_m^2 + y_m^2)\right]$$

At step 1204, the one or more processing devices may multiply the spherical wave by the discrete display modulation function pointwise. The light field or the spherical wave after being modulated by the mask may be given by the following equation:

$$O_m(x_m, y_m, \lambda) = \frac{M(x_m, y_m)O(0, 0, \lambda)}{j\lambda z_o} \exp\left[\frac{j\pi}{\lambda z_o}(x_m^2 + y_m^2)\right]$$

At step 1206, the one or more processing devices may use an angular spectrum method to numerically propagate the modulated discrete light field to the lens plane. For instance, the modulated light field may propagate a distance of $z_m$ and pass through a lens (e.g., lens 224) at the lens plane. The light field after the lens may be given by the following equation:

$$O_l(x_l, y_l, \lambda) = \frac{P(x_l, y_l\lambda)\exp\left[\frac{-j\pi}{\lambda f}(x_l^2 + y_l^2)\right]}{j\lambda z_m}$$
$$\iint O_m(x_m, y_m, \lambda)\exp\left\{\frac{j\pi}{\lambda z_m}[(x_l - x_m)^2 + (y_l - y_m)^2]\right\}$$

At step 1208, the one or more processing devices may multiply the propagated light field by discrete lens modulation function pointwise. At step 1210, the one or more processing devices may use an angular spectrum method to numerically propagate the modulated discrete light field (e.g., obtained after step 1208) to the sensor plane. The resulting light field at the sensor plane (e.g., at image sensor 222) may be represented by the following equation:

$$O_s(x_s, y_s, \lambda) = \frac{1}{j\lambda z_i} \iint O_l(x_l, y_l, \lambda)\exp\left\{\frac{j\pi}{\lambda z_i}[(x_s - x_l)^2 + (y_s - yi)^2]\right\}$$

At step 1212, the one or more processing devices may multiply the resulting light field (e.g., obtained after step 1210) by the spectral response corresponding to the given wavelength A to compute a simulated PSF for an image. The PSF may be computed by the following equation:

$$h(x_s, y_s, \lambda) = |O_s(x_s, y_s, \lambda)|^2$$

The overall PSF (e.g., HDR PSF) of the imaging system (e.g., system 200B) may be obtained by incoherent superimposition of the PSF of each wavelength, as represented by the following equation:

$$h_k(x_s, y_s) = \Sigma [F_k(\lambda) h(x_s, y_s, \lambda)] d\lambda$$

FIG. 13 illustrates an example comparison between an example simulated PSF 1302 computed using the wave optics process 1200 and an example measured PSF 1304 generated using the multi-exposure stack measurement and HDR fusion process 1000. The simulated PSF 1302 may be sufficiently close to the measured PSF 1304. In some embodiments, instead of the measured PSF 1304, the simulated PSF 1302 may be capable enough to be used in the image deconvolution process (e.g., image deconvolution process 1400) for flare mitigation.

Image Deconvolution for Flare Mitigation

Figure 14:
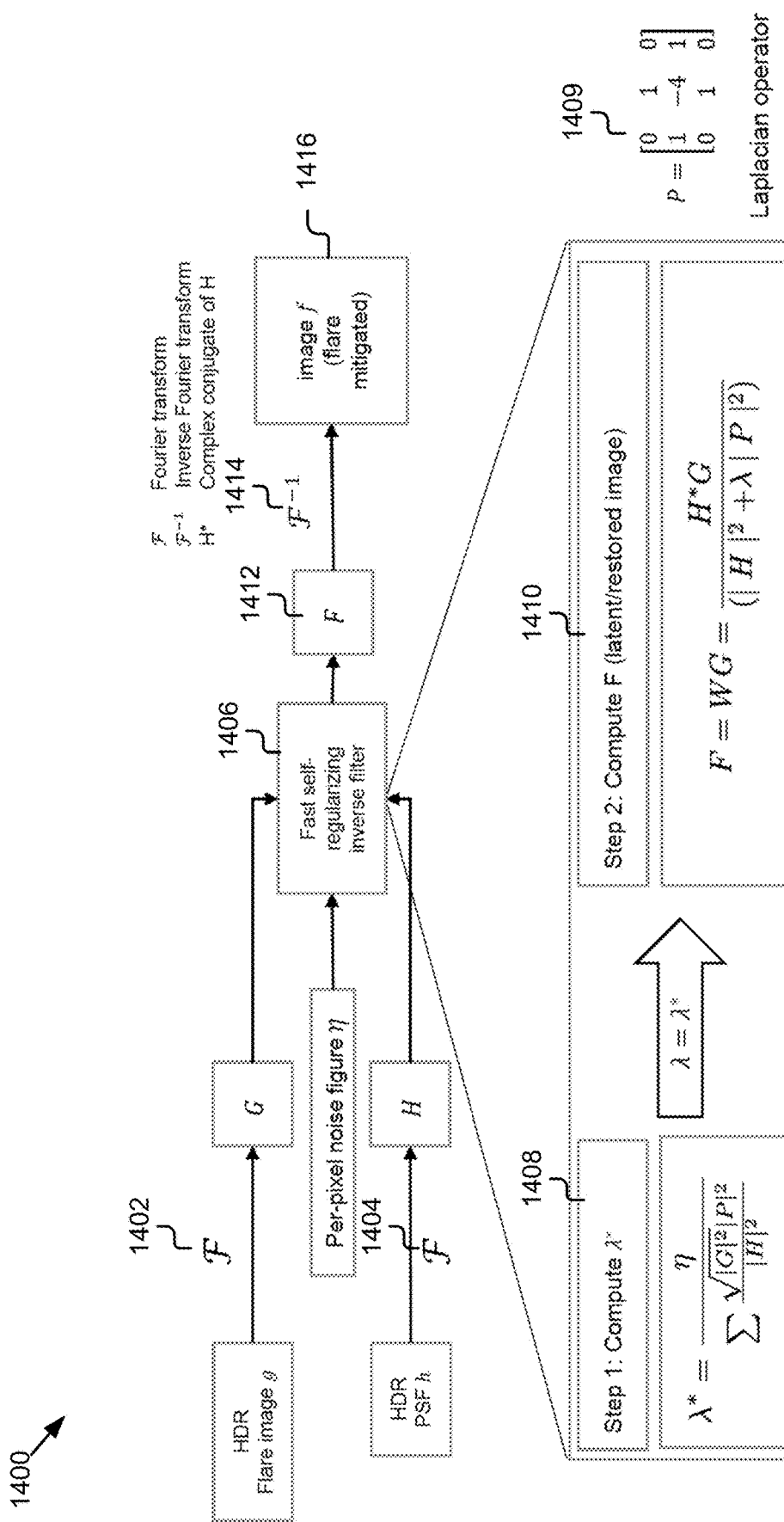
FIG. 14 illustrates an example method or process of image deconvolution for flare mitigation.

Now that a HDR image (e.g., HDR image 612 or 804) and a HDR PSF (e.g., HDR PSF 632 or 1104) are obtained (e.g., through processes 700-750, 1000, or 1200), an image deconvolution process may be performed to successfully mitigate flare. FIG. 14 illustrates an example method or process 1400 of image deconvolution for flare mitigation. The process 1400 begins with one or more processing devices (e.g., one or more processors 204 of the electronic device 202), at steps 1402 and 1404, taking a Fourier transform $f$ ) to obtain spatial frequency domain information or versions of both the input HDR flare image g and the HDR PSF h, respectively. As discussed elsewhere herein, the HDR flare image g may be obtained through processes discussed in reference to FIGS. 7A-7C. The HDR PSF h may be obtained through either process 1000 discussed in reference to FIG. 10 or process 1200 discussed in reference to FIG. 12.

Next, at step 1406, the one or more processing devices may apply a regularized inverse filter, such as a self-regularizing inverse filter, to reverse the process of diffraction of the image based on HDR image G and HDR PSF H obtained after Fourier transformation (F). In particular embodiments, step 1406 is a two-step process. In the first step 1408 of step 1406, the one or more processing devices may compute λ* using Fourier transformation of the HDR image, PSF, and the Laplacian operator 1409. η is a noise power that may be estimated from the HDR image itself. In step 1410 of step 1406, the one or more processing devices may compute a reconstructed, latent, or restored image F (indicated by reference numeral 1412) in spatial frequency domain by applying the inverse filter according to the equation shown in step 1410. This step 1410 calculates the original clear image while keeping the high frequency noise under control. Finally, to visualize the original image, the one or more processing devices, at step 1414, may apply an inverse Fourier transform $f^{-1}$) to convert the result 1412 (e.g., latent or restored image) from the spatial frequency domain back to the spatial domain. In particular embodiments, the output image 1416 produced after step 1414 is a flare mitigated image (i.e., image with flare artifacts mitigated or removed), as shown, for example, reconstructed image 652 in FIG. 6, reconstructed image 1506 in FIG. 15A, reconstructed image 1516 in FIG. 15B, or reconstructed image 1526 in FIG. 15C.

It should be noted that the process 1400 of image deconvolution discussed herein is just one example embodiment of many image deconvolution algorithms, which are possible and within the scope of the present disclosure. For example, the Laplacian operator 1409 may be replaced by operators that penalize high frequency noise and makes the reconstructed image smoother. The main idea behind image deconvolution process 1400 is to use the information of the HDR flare image (e.g., HDR image 612 or 804) and a HDR PSF (e.g., HDR PSF 632 or 1104) to invert the diffraction process such that the flare tail artifacts may be brought back to the center light source.

In addition to the regularized inverse filter (e.g., self-regularizing filter) as discussed in step 1406 of FIG. 14, there may be various other image deconvolution algorithms that may be utilized to reverse the diffraction process and mitigate flare. One example of such alternative image deconvolution technique is Richardson-Lucy deconvolution, where the deconvolution algorithm is an iterative process. The Richardson-Lucy deconvolution is represented by the following equation:

$$\breve{u} = (t+1) \cdot \frac{d}{\breve{u}(t) \otimes P} \otimes P*$$

As represented in the above equation, division and multiplication are element wise. ⊗ indicates a 2D convolution and P* is the flipped point spread function.

FIGS. 15A-15C illustrate examples of degraded images (e.g., images with flare artifacts) and corresponding reconstructed images with flare artifacts mitigated/removed, in accordance with the presently disclosed embodiments. Specifically, FIG. 15A shows a flare image 1502 that may be captured using a UDC system with high density/quality display mask in front of a camera/image sensor, such as the UDC system setup 200B shown in FIG. 2B. As depicted, the flare image 1502 contains flare artifacts 1504 arising due to the bright light source, which in this particular case is the bulb. The image on the right shows the reconstructed image 1506 with these flare artifacts removed based on the image reconstruction solution discussed in reference to at least FIG. 6. As another example, FIG. 15B shows a degraded or flare image 1512 containing flare artifacts 1514 arising due to the bright light source, which in this particular case is the sunlight. Due to these image artifacts 1514, the picture of the unicorn is not clear. The image on the right shows the reconstructed image 1516 with these flare artifacts mitigated and much clearer picture of the unicorn based on the image reconstruction solution or technique discussed herein. Yet as another example, FIG. 15C shows a degraded or flare image 1522 containing flare artifacts 1524 arising due to the bright light source, which in this particular case is the sunlight striking on metallic parts of a car. The image on the right shows the reconstructed image 1526 with these flare artifacts removed and a clear depiction of the car based on the image reconstruction solution or technique discussed herein.

FIG. 16A illustrates a flow diagram of an example method 1600 for generating and storing a HDR PSF during an initial or one-time camera calibration stage of an electronic device, in accordance with the presently disclosed embodiments. The method 1600 may be performed utilizing one or more processing devices (e.g., the one or more processors 204 of the electronic device 202) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 1600 may begin at block 1602 with one or more processing devices (e.g., one or more processors 204 of the electronic device 202) capturing, by a camera disposed behind a display panel of the electronic device, a plurality of PSFs. The PSFs may be captured using the PSF measurement setup 900 shown in FIG. 9. Each PSF of the plurality of PSFs may be captured at a different exposure (e.g., exposure time), as discussed in reference to at least FIG. 7B and shown in FIG. 11. The PSF may describe information regarding diffraction of light by the display panel of the electronic device to cause the flare artifacts in the one or more captured images, as discussed elsewhere herein. The method 1600 may then continue at block 1604 with the one or more processing devices (e.g., one or more processors 204 of the electronic device 202) generating a HDR PSF by fusing the plurality of PSFs captured at different exposures (e.g., exposure times), as shown and discussed in reference to at least FIGS. 10 and 11. The method 1600 may then conclude at block 1606 with the one or more processing devices (e.g., one or more processors 204 of the electronic device 202) storing the HDR PSF in a memory of the electronic device (e.g., memory 206 of the electronic device 202). The HDR PSF generated and stored during the initial camera or device calibration stage may be later used during camera use for generating a reconstructed image, as discussed below in reference to FIG. 16B.

FIG. 16B illustrates a flow diagram of an example method 1650 for generating a reconstructed image with flare artifacts mitigated, in accordance with the presently disclosed embodiments. The method 1650 may be performed at runtime during actual camera use. The method 1650 may be performed utilizing one or more processing devices (e.g., the one or more processors 204 of the electronic device 202) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 1650 may begin at block 1652 with one or more processing devices (e.g., one or more processors 204 of the electronic device 202) capturing, by a camera disposed behind a display panel of the electronic device, a plurality of images at a plurality of exposures (e.g., exposure times), respectively, as discussed in reference to at least FIGS. 7B and 8. The one or more captured images may contain one or more flare artifacts, as shown, for example, in captured image 228 in FIG. 2B. The method 1650 may then continue at block 1654 with the one or more processing devices (e.g., one or more processors 204 of the electronic device 202) generating a high dynamic range (HDR) image by fusing the plurality of images captured at different exposures (e.g., exposure times), as discussed in reference to at least FIGS. 7C and 8. In some embodiments, the plurality of exposures associated with the plurality of images may be modified by adjusting a sensor integration time and the plurality of images with modified exposures may be fused into the HDR image. The method 1650 may then continue at block 1656 with the one or more processing devices (e.g., one or more processors 204 of the electronic device 202) accessing or retrieving the HDR PSF from the memory of the electronic device (e.g., memory 206 of the electronic device 202). As discussed above in reference to method 1600 of FIG. 16A, the HDR PSF may be generated during a one-time device or camera calibration stage at the beginning. The HDR PSF may be generated by fusing a plurality of PSFs captured at different exposures (e.g., exposure times). The method 1650 may then conclude at block 1658 with the one or more processing devices (e.g., one or more processors 204 of the electronic device 202) generating, using an image deconvolution technique, a reconstructed image with flare artifacts mitigated (e.g., removed) based on the HDR image and the HDR PSF, as discussed in reference to at least FIG. 14. It should be noted that, in some embodiments, the step 1656 may be performed at the beginning of the method 1650 (i.e., prior to step 1652). In other embodiments, the step 1656 may be combined into step 1658. That is, the step 1658 may include the step 1656. Other variations and sequencing of steps of the method 1650 are also possible and within the scope of the present disclosure.

Systems and Methods

Figure 17:
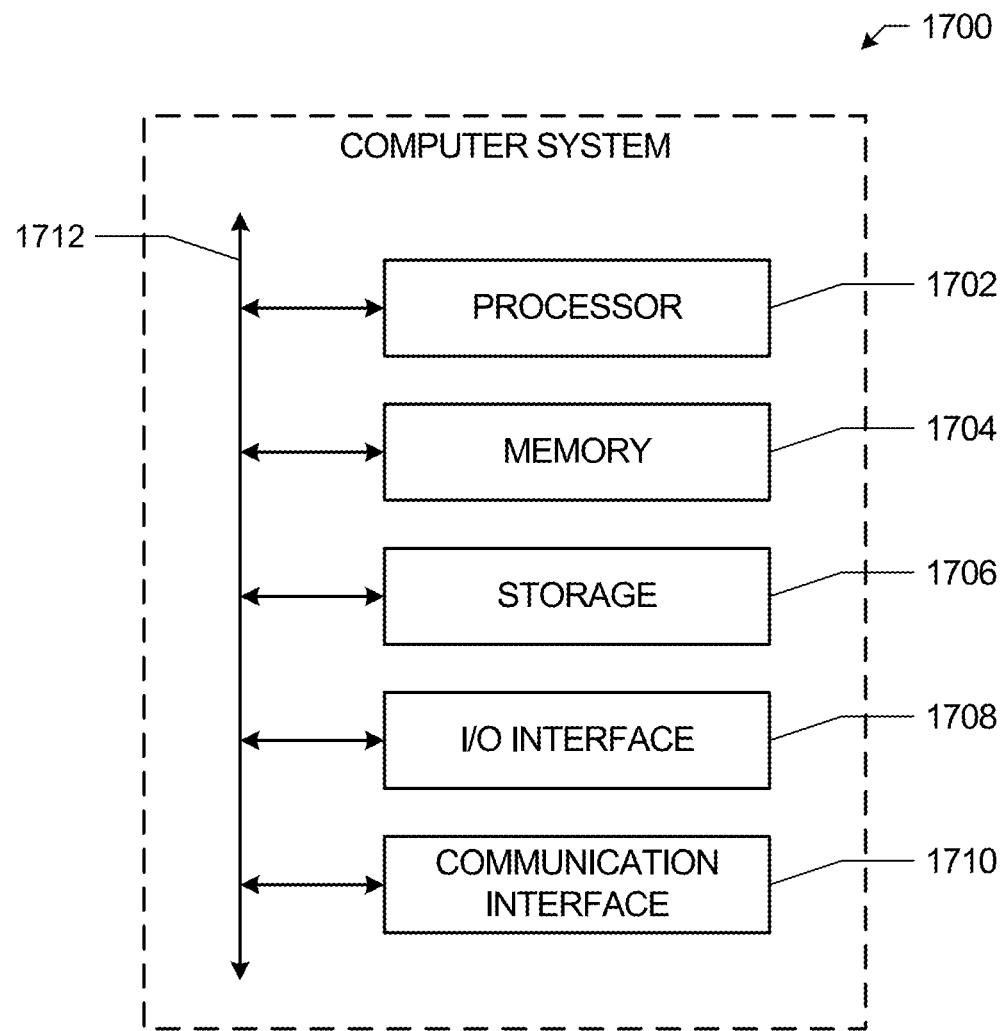
FIG. 17 illustrates an example computer system.

FIG. 17 illustrates an example computer system 1700 that may be utilized for generating a high dynamic range (HDR) fused image (e.g., HDR image 612 or 804), a HDR PSF (e.g., HDR PSF 632 or 1104), and a reconstructed image with flare mitigated or removed (e.g., reconstructed image 652, reconstructed image 1506, reconstructed image 1516, or reconstructed image 1526), in accordance with the presently disclosed embodiments. In particular embodiments, one or more computer systems 1700 perform one or more steps of one or more methods or processes described or illustrated herein. In particular embodiments, one or more computer systems 1700 provide functionality described or illustrated herein. In particular embodiments, software running on one or more computer systems 1700 performs one or more steps of one or more methods or processes described or illustrated herein or provides functionality described or illustrated herein. Particular embodiments include one or more portions of one or more computer systems 1700. Herein, reference to a computer system may encompass a computing device, and vice versa, where appropriate. Moreover, reference to a computer system may encompass one or more computer systems, where appropriate.

This disclosure contemplates any suitable number of computer systems 1700. This disclosure contemplates computer system 1700 taking any suitable physical form. As example and not by way of limitation, computer system 1700 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1700 may include one or more computer systems 1700; be unitary or distributed; span multiple locations; span multiple machines; span multiple data centers; or reside in a cloud, which may include one or more cloud components in one or more networks.

Where appropriate, one or more computer systems 1700 may perform without substantial spatial or temporal limitation one or more steps of one or more methods or processes described or illustrated herein. As an example, and not by way of limitation, one or more computer systems 1700 may perform in real time or in batch mode one or more steps of one or more methods or processes described or illustrated herein. One or more computer systems 1700 may perform at different times or at different locations one or more steps of one or more methods or processes described or illustrated herein, where appropriate.

In particular embodiments, computer system 1700 includes a processor 1702, memory 1704, storage 1706, an input/output (I/O) interface 1706, a communication interface 1710, and a bus 1712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1702 includes hardware for executing instructions, such as those making up a computer program. As an example, and not by way of limitation, to execute instructions, processor 1702 may retrieve (or fetch) the instructions from an internal register, an internal cache, memory 1704, or storage 1706; decode and execute them; and then write one or more results to an internal register, an internal cache, memory 1704, or storage 1706. In particular embodiments, processor 1702 may include one or more internal caches for data, instructions, or addresses. This disclosure contemplates processor 1702 including any suitable number of any suitable internal caches, where appropriate. As an example, and not by way of limitation, processor 1702 may include one or more instruction caches, one or more data caches, and one or more translation lookaside buffers (TLBs). Instructions in the instruction caches may be copies of instructions in memory 1704 or storage 1706, and the instruction caches may speed up retrieval of those instructions by processor 1702. Data in the data caches may be copies of data in memory 1704 or storage 1706 for instructions executing at processor 1702 to operate on; the results of previous instructions executed at processor 1702 for access by subsequent instructions executing at processor 1702 or for writing to memory 1704 or storage 1706; or other suitable data. The data caches may speed up read or write operations by processor 1702. The TLBs may speed up virtual-address translation for processor 1702. In particular embodiments, processor 1702 may include one or more internal registers for data, instructions, or addresses. This disclosure contemplates processor 1702 including any suitable number of any suitable internal registers, where appropriate. Where appropriate, processor 1702 may include one or more arithmetic logic units (ALUs); be a multi-core processor; or include one or more processors 1702. Although this disclosure describes and illustrates a particular processor, this disclosure contemplates any suitable processor.

In particular embodiments, memory 1704 includes main memory for storing instructions for processor 1702 to execute or data for processor 1702 to operate on. As an example, and not by way of limitation, computer system 1700 may load instructions from storage 1706 or another source (such as, for example, another computer system 1700) to memory 1704. Processor 1702 may then load the instructions from memory 1704 to an internal register or internal cache. To execute the instructions, processor 1702 may retrieve the instructions from the internal register or internal cache and decode them. During or after execution of the instructions, processor 1702 may write one or more results (which may be intermediate or final results) to the internal register or internal cache. Processor 1702 may then write one or more of those results to memory 1704. In particular embodiments, processor 1702 executes only instructions in one or more internal registers or internal caches or in memory 1704 (as opposed to storage 1706 or elsewhere) and operates only on data in one or more internal registers or internal caches or in memory 1704 (as opposed to storage 1706 or elsewhere).

One or more memory buses (which may each include an address bus and a data bus) may couple processor 1702 to memory 1704. Bus 1712 may include one or more memory buses, as described below. In particular embodiments, one or more memory management units (MMUs) reside between processor 1702 and memory 1704 and facilitate accesses to memory 1704 requested by processor 1702. In particular embodiments, memory 1704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1704 may include one or more memories 1704, where appropriate. Although this disclosure describes and illustrates particular memory, this disclosure contemplates any suitable memory.

In particular embodiments, storage 1706 includes mass storage for data or instructions. As an example, and not by way of limitation, storage 1706 may include a hard disk drive (HDD), a floppy disk drive, flash memory, an optical disc, a magneto-optical disc, magnetic tape, or a Universal Serial Bus (USB) drive or a combination of two or more of these. Storage 1706 may include removable or non-removable (or fixed) media, where appropriate. Storage 1706 may be internal or external to computer system 1700, where appropriate. In particular embodiments, storage 1706 is non-volatile, solid-state memory. In particular embodiments, storage 1706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1706 taking any suitable physical form. Storage 1706 may include one or more storage control units facilitating communication between processor 1702 and storage 1706, where appropriate. Where appropriate, storage 1706 may include one or more storages 1706. Although this disclosure describes and illustrates particular storage, this disclosure contemplates any suitable storage.

In particular embodiments, I/O interface 1706 includes hardware, software, or both, providing one or more interfaces for communication between computer system 1700 and one or more I/O devices. Computer system 1700 may include one or more of these I/O devices, where appropriate. One or more of these I/O devices may enable communication between a person and computer system 1700. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1706 for them. Where appropriate, I/O interface 1706 may include one or more device or software drivers enabling processor 1702 to drive one or more of these I/O devices. I/O interface 1706 may include one or more I/O interfaces 1706, where appropriate. Although this disclosure describes and illustrates a particular I/O interface, this disclosure contemplates any suitable I/O interface.

In particular embodiments, communication interface 1710 includes hardware, software, or both providing one or more interfaces for communication (such as, for example, packet-based communication) between computer system 1700 and one or more other computer systems 1700 or one or more networks. As an example, and not by way of limitation, communication interface 1710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1710 for it.

As an example, and not by way of limitation, computer system 1700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1700 may include any suitable communication interface 1710 for any of these networks, where appropriate. Communication interface 1710 may include one or more communication interfaces 1710, where appropriate. Although this disclosure describes and illustrates a particular communication interface, this disclosure contemplates any suitable communication interface.

In particular embodiments, bus 1712 includes hardware, software, or both coupling components of computer system 1700 to each other. As an example, and not by way of limitation, bus 1712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1712 may include one or more buses 1712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an electronic device:
capturing, by a camera disposed behind a display panel of the electronic device, a plurality of images at a plurality of exposures, respectively, wherein one or more captured images of the plurality of images comprise one or more flare artifacts;
generating a high dynamic range (HDR) image by fusing the plurality of images;
accessing a HDR point spread function (PSF) from a memory of the electronic device, the HDR PSF being generated, at an initial camera calibration stage, by fusing a plurality of PSFs captured at the plurality of exposures, respectively; and
generating, using an image deconvolution technique, a reconstructed image with flare artifacts mitigated based on the HDR image and the HDR PSF.

2. The method of claim 1, wherein capturing the plurality of images at the plurality of exposures comprises:
(1) capturing a first image of the plurality of images at a first exposure such that a brightest pixel value in the first image is barely above a noise floor level, wherein the first image captured at the first exposure guarantees that a flare source causing the one or more flare artifacts is not saturated in the first image;
(2) storing the captured image to an image stack;
(3) calculating a mean value of a subset of pixel values in a last captured image and determining whether the mean value of the subset of pixel values is greater than a certain threshold value;
(4) in response to determining that the mean value of the subset of pixel values is lower than the certain threshold value, increasing the first exposure by a predetermined factor for capturing a subsequent image of the plurality of images;
(5) capturing the subsequent image of the plurality of images at the increased exposure; and
(6) repeating steps (2)-(5) until the mean value of the subset of pixel values in the last captured image is greater than the certain threshold value.

3. The method of claim 1, wherein generating the HDR image comprises:
determining, for each image of the plurality of images, pixel intensity data for each of a plurality of pixel locations of the image, wherein the pixel intensity data is associated with an exposure of the respective image; and
calculating, for each pixel location, a weighted average pixel intensity value based on the pixel intensity data and the exposure for the respective pixel location over the plurality of images,
wherein the HDR image is generated based on weighted average pixel intensity values of the plurality of pixel locations.

4. The method of claim 3, wherein prior to determining the pixel intensity data, the method further comprises one or more of:
offsetting each of pixel values of the plurality of images by a predetermined value;
applying one or more masks to select a subset of pixel values from a set of pixel values associated with the plurality of images, wherein the selected subset of pixel values is used in generating the HDR image; or
correcting one or more misalignments in the plurality of images.

5. The method of claim 4, wherein the one or more masks comprise:
a hot pixel mask with interpolation to filter out defective pixels when a long exposure complete dark image is taken;
a noise floor pixel mask to select pixels that are above a noise floor level; or
a saturated pixel mask to filter out saturated pixels.

6. The method of claim 1, wherein generating the reconstructed image comprises:
computing a Fourier transformation of each of the HDR image and the HDR PSF to obtain a second HDR image in spatial frequency domain and a second HDR PSF in spatial frequency domain;
generating a restored image in spatial frequency domain by applying a regularized inverse filter to reverse the process of diffraction of the HDR image based on the second HDR image and the second HDR PSF; and
applying an inverse Fourier transform to the restored image in spatial frequency domain to convert the restored image from spatial frequency domain to spatial domain, wherein an image resulting after the conversion is the reconstructed image with flare artifacts mitigated.

7. The method of claim 1, wherein:
the plurality of exposures associated with the plurality of images is modified by adjusting a sensor integration time; and
the plurality of images with modified exposures are fused into the HDR image.

8. An electronic device comprising:
a display panel;
a camera disposed behind the display panel;
one or more non-transitory computer-readable storage media including instructions; and
one or more processors coupled to the storage media and the camera, the one or more processors configured to execute the instructions to:
capture, by the camera disposed behind the display panel of the electronic device, a plurality of images at a plurality of exposures, respectively, wherein one or more captured images of the plurality of images comprise one or more flare artifacts;
generate a high dynamic range (HDR) image by fusing the plurality of images;
access a HDR point spread function (PSF) from a memory of the electronic device, the HDR PSF being generated, at an initial camera calibration stage, by fusing a plurality of PSFs captured at the plurality of exposures, respectively; and
generate, using an image deconvolution technique, a reconstructed image with flare artifacts mitigated based on the HDR image and the HDR PSF.

9. The electronic device of claim 8, wherein the instructions to capture the plurality of images at the plurality of exposures further comprise instructions to:
(1) capture a first image of the plurality of images at a first exposure such that a brightest pixel value in the first image is barely above a noise floor level, wherein the first image captured at the first exposure guarantees that a flare source causing the one or more flare artifacts is not saturated in the first image;
(2) store the captured image to an image stack;
(3) calculate a mean value of a subset of pixel values in a last captured image and determining whether the mean value of the subset of pixel values is greater than a certain threshold value;
(4) in response to determining that the mean value of the subset of pixel values is lower than the certain threshold value, increase the first exposure by a predetermined factor for capturing a subsequent image of the plurality of images;

(5) capture the subsequent image of the plurality of images at the increased exposure; and (6) repeat steps (2)-(5) until the mean value of the subset of pixel values in the last captured image is greater than the certain threshold value.

10. The electronic device of claim 8, wherein the instructions to generate the HDR image further comprise instructions to:

determine, for each image of the plurality of images, pixel intensity data for each of a plurality of pixel locations of the image, wherein the pixel intensity data is associated with an exposure of the respective image; and calculate, for each pixel location, a weighted average pixel intensity value based on the pixel intensity data and the exposure for the respective pixel location over the plurality of images, wherein the HDR image is generated based on weighted average pixel intensity values of the plurality of pixel locations.

11. The electronic device of claim 10, wherein prior to determining the pixel intensity data, the instructions to generate the HDR image further comprise instructions to:

offset each of pixel values of the plurality of images by a predetermined value;

apply one or more masks to select a subset of pixel values from a set of pixel values associated with the plurality of images, wherein the selected subset of pixel values is used in generating the HDR image; or correct one or more misalignments in the plurality of images.

12. The electronic device of claim 11, wherein the one or more masks comprise:

a hot pixel mask with interpolation to filter out defective pixels when a long exposure complete dark image is taken;

a noise floor pixel mask to select pixels that are above a noise floor level; or a saturated pixel mask to filter out saturated pixels.

13. The electronic device of claim 8, wherein the instructions to generate the reconstructed image further comprise instructions to:

compute a Fourier transformation of each of the HDR image and the HDR PSF to obtain a second HDR image in spatial frequency domain and a second HDR PSF in spatial frequency domain;

generate a restored image in spatial frequency domain by applying a regularized inverse filter to reverse the process of diffraction of the HDR image based on the second HDR image and the second HDR PSF; and apply an inverse Fourier transform to the restored image in spatial frequency domain to convert the restored image from spatial frequency domain to spatial domain, wherein an image resulting after the conversion is the reconstructed image with flare artifacts mitigated.

14. The electronic device of claim 8, wherein:

the plurality of exposures associated with the plurality of images is modified by adjusting a sensor integration time; and the plurality of images with modified exposures are fused into the HDR image.

15. A non-transitory computer-readable medium comprising instructions that, when executed by one or more processors of an electronic device, cause the one or more processors to:

capture, by a camera disposed behind a display panel of the electronic device, a plurality of images at a plurality of exposures, respectively, wherein one or more captured images of the plurality of images comprise one or more flare artifacts;

generate a high dynamic range (HDR) image by fusing the plurality of images;

access a HDR point spread function (PSF) from a memory of the electronic device, the HDR PSF being generated, at an initial camera calibration stage, by fusing a plurality of PSFs captured at the plurality of exposures, respectively; and generate, using an image deconvolution technique, a reconstructed image with flare artifacts mitigated based on the HDR image and the HDR PSF.

16. The non-transitory computer-readable medium of claim 15, wherein the instructions to capture the plurality of images at the plurality of exposures further comprise instructions to:

(1) capture a first image of the plurality of images at a first exposure such that a brightest pixel value in the first image is barely above a noise floor level, wherein the first image captured at the first exposure guarantees that a flare source causing the one or more flare artifacts is not saturated in the first image;

(2) store the captured image to an image stack;

(3) calculate a mean value of a subset of pixel values in a last captured image and determining whether the mean value of the subset of pixel values is greater than a certain threshold value;

(4) in response to determining that the mean value of the subset of pixel values is lower than the certain threshold value, increase the first exposure by a predetermined factor for capturing a subsequent image of the plurality of images;

(5) capture the subsequent image of the plurality of images at the increased exposure; and (6) repeat steps (2)-(5) until the mean value of the subset of pixel values in the last captured image is greater than the certain threshold value.

17. The non-transitory computer-readable medium of claim 15, wherein the instructions to generate the HDR image further comprise instructions to:

determine, for each image of the plurality of images, pixel intensity data for each of a plurality of pixel locations of the image, wherein the pixel intensity data is associated with an exposure of the respective image; and calculate, for each pixel location, a weighted average pixel intensity value based on the pixel intensity data and the exposure for the respective pixel location over the plurality of images, wherein the HDR image is generated based on weighted average pixel intensity values of the plurality of pixel locations.

18. The non-transitory computer-readable medium of claim 17, wherein prior to determining the pixel intensity data, the instructions to generate the HDR image further comprise instructions to:

offset each of pixel values of the plurality of images by a predetermined value;

apply one or more masks to select a subset of pixel values from a set of pixel values associated with the plurality of images, wherein the selected subset of pixel values is used in generating the HDR image; or correct one or more misalignments in the plurality of images.

19. The non-transitory computer-readable medium of claim 18, wherein the one or more masks comprise:

a hot pixel mask with interpolation to filter out defective pixels when a long exposure complete dark image is taken;

a noise floor pixel mask to select pixels that are above a noise floor level; or a saturated pixel mask to filter out saturated pixels.

20. The non-transitory computer-readable medium of claim 15, wherein the instructions to generate the reconstructed image further comprise instructions to:

compute a Fourier transformation of each of the HDR image and the HDR PSF to obtain a second HDR image in spatial frequency domain and a second HDR PSF in spatial frequency domain;

generate a restored image in spatial frequency domain by applying a regularized inverse filter to reverse the process of diffraction of the HDR image based on the second HDR image and the second HDR PSF; and apply an inverse Fourier transform to the restored image in spatial frequency domain to convert the restored image from spatial frequency domain to spatial domain, wherein an image resulting after the conversion is the reconstructed image with flare artifacts mitigated.

* * * * *